(12) United States Patent
Kim et al.

(10) Patent No.: US 9,817,214 B2
(45) Date of Patent: Nov. 14, 2017

(54) PHOTOGRAPHING LENSES AND PHOTOGRAPHING APPARATUS

(71) Applicant: Samsung Electronics Co., Ltd., Gyeonggi-do (KR)

(72) Inventors: Han-eung Kim, Gyeonggi-do (KR); Jeong-kil Shin, Gyeonggi-do (KR); Hyun-jun Shin, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/883,948

(22) Filed: Oct. 15, 2015

(65) Prior Publication Data

US 2016/0124193 A1    May 5, 2016

(30) Foreign Application Priority Data

Nov. 3, 2014    (KR) ........................ 10-2014-0151579

(51) Int. Cl.
| | | |
|---|---|---|
| *G02B 13/18* | (2006.01) | |
| *G02B 3/02* | (2006.01) | |
| *G02B 9/62* | (2006.01) | |
| *G02B 13/00* | (2006.01) | |
| *G02B 27/00* | (2006.01) | |

(52) U.S. Cl.
CPC ........... *G02B 13/0045* (2013.01); *G02B 9/62* (2013.01); *G02B 27/0025* (2013.01)

(58) Field of Classification Search
CPC .............................. G02B 13/0045; G02B 9/62
USPC .......................... 359/713, 752, 756, 757, 759
See application file for complete search history.

(56) References Cited

U.S. PATENT DOCUMENTS

| | | | |
|---|---|---|---|
| 8,472,128 B2 | 6/2013 | Huang | |
| 8,477,431 B2 | 7/2013 | Huang | |
| 2015/0029599 A1* | 1/2015 | Huang | ..................... G02B 3/04 |
| | | | 359/713 |

(Continued)

FOREIGN PATENT DOCUMENTS

| | | |
|---|---|---|
| EP | 2 708 929 A2 | 3/2014 |
| TW | 201432299 A | 8/2014 |

OTHER PUBLICATIONS

European Search Report, dated Mar. 18, 2016.

*Primary Examiner* — William Choi
(74) *Attorney, Agent, or Firm* — Cha & Reiter, LLC

(57) ABSTRACT

Photographing lenses and a photographing apparatus including the photographing lenses using several lenses and to incorporate high-performance photographing apparatuses in slim portable terminals while maintaining optical characteristics and aberration characteristics of the high-performance photographing apparatuses. The photographing lenses include: a first lens having a positive refractive power and a convex object-side surface; a second lens having a positive refractive power; a third lens having a negative refractive power; a fourth lens having a convex image-side surface; a fifth lens having an object-side surface and an image-side surface that are concave in a region around an optical axis of the photographing lenses; and a sixth lens having an image-side surface that is concave in a region around the optical axis of the photographing lenses. The first lens to sixth lens are sequentially arranged in a direction from an object side to an image side.

16 Claims, 23 Drawing Sheets

(56) References Cited

U.S. PATENT DOCUMENTS

2015/0316749 A1 11/2015 Chen
2016/0131899 A1* 5/2016 Jo .................... G02B 5/005
                                                 348/294

* cited by examiner

PHOTOGRAPHING LENSES AND PHOTOGRAPHING APPARATUS

CLAIM OF PRIORITY

This application claims the benefit of priority of Korean Patent Application No. 10-2014-0151579, filed on Nov. 3, 2014, in the Korean Intellectual Property Office, the disclosure of which is incorporated herein in its entirety by reference in its entirety.

BACKGROUND

1. Field of the Disclosure

The present disclosure relates to small, high-performance photographing lenses and a photographing apparatus (i.e. cameras, camera hardware modules) including the photographing lenses.

2. Description of the Related Art

Many photographing apparatuses use solid-state photographing devices such as charge-coupled device (CCD) image sensors and complementary metal-oxide semiconductor (CMOS) image sensors. Examples of such photographing apparatuses include digital still cameras, video cameras, and interchangeable lens cameras. Recently, photographing apparatuses employing solid-state imaging devices are being manufactured in smaller sizes because the market demands thinner overall devices that include such cameras. For example, recently developed handheld devices such as smart phones are equipped with such photographing apparatuses, yet such smartphones are thinner than ever. Consumers demand ever-increasing high-performance devices such as high-resolution, wide-angle devices. In addition, an increasing number of consumers have expert knowledge about cameras.

Small photographing apparatuses used in many devices, such as high-pixel photographing apparatuses, have a complex construction requiring high-resolution and high-performance photographing lenses. However, there is a great deal of difficulty in manufacturing such high-performance photographing apparatuses when only using four or five lenses due to size constraints of devices such as smartphones, portable terminals, etc., and to incorporate high-performance photographing apparatuses in slim portable terminals while maintaining optical characteristics and aberration characteristics of the larger-sized high-performance photographing apparatuses.

SUMMARY

This disclosure provides constructions of relatively small, high-performance photographing lenses than can be arranged in thin handheld devices, such as portable terminals, tablets, etc.

Also provided is a photographing apparatus including small, high-performance photographing lenses.

Additional aspects of the disclosure will be set forth in part in the description which follows and, in part, will be better understood by a person of ordinary skill in the art from the detailed description including the drawing figures, and/or may be learned by an artisan's practice of the presented embodiments.

According to an aspect of an embodiment, an arrangement of the plurality of photographing lenses include: a first lens arranged closest to an object side having a positive refractive power and a convex object-side surface; a second lens having a positive refractive power; a third lens having a negative refractive power; a fourth lens having a convex image-side surface; a fifth lens having an object-side surface and an image-side surface that are concave in a region around an optical axis of the photographing lenses; and a sixth lens arranged furthest from the object side and having an image-side surface that is concave in a region surrounding the optical axis of the photographing lenses, wherein the first lens to sixth lens are sequentially arranged in a direction from the object side to the image side.

The photographing lenses may satisfy the following formula:

$$|R2/R1|>1 \qquad \text{<Formula>}$$

wherein R1 denotes a radius of curvature of the object-side surface of the first lens, and R2 denotes a radius of curvature of an image-side surface of the first lens.

The photographing lenses may satisfy the following formula:

$$0<f3/f5<1 \qquad \text{<Formula>}$$

wherein f3 denotes a focal length of the third lens, and f5 denotes a focal length of the fifth lens.

The photographing lenses may satisfy the following formula:

$$(0<R12/R10<1 \qquad \text{<Formula>}$$

wherein R10 denotes a radius of curvature of the image-side surface of the fifth lens, and R12 denotes a radius of curvature of the image-side surface of the sixth lens.

The photographing lenses may satisfy the following formula:

$$(f1+f2)/2>f12 \qquad \text{<Formula>}$$

wherein f1 denotes a focal length of the first lens, f2 denotes a focal length of the second lens, and f12 denotes a composite focal length of the first and second lenses.

The photographing lenses may satisfy the following formulas:

$$|R2/R1|>1$$

$$|f/f5|+|f/f6|<1 \qquad \text{<Formulas>}$$

where R1 denotes a radius of curvature of the object-side surface of the first lens, R2 denotes a radius of curvature of an image-side surface of the first lens, f denotes a focal length of the photographing lenses, f5 denotes a focal length of the fifth lens, and f6 denotes a focal length of the sixth lens.

The third lens may have a concave image-side surface.

The first lens may be a double convex lens or a meniscus lens.

The fourth lens may have a meniscus shape.

At least one of the object-side surface and the image-side surface of the fifth lens may have an inflection point.

At least one of an object-side surface and the image-side surface of the sixth lens may have an inflection point.

Each of the first lens to sixth lens may be a plastic lens.

Each of the first lens to sixth lens may have at least one aspheric surface.

Each of the first lens to sixth lens may be a double aspheric lens.

The fourth lens may have a positive refractive power, the fifth lens may have a negative refractive power, and the sixth lens may have a negative or positive refractive power.

The photographing lenses may further include an aperture stop arranged at a position between the object-side surface of the first lens and the third lens.

According to an aspect of another embodiment, a photographing apparatus includes: photographing lenses; and an image sensor configured to receive light through the photographing lenses and convert the light into an electric image signal, wherein the photographing lenses include: a first lens having a positive refractive power and a convex object-side surface; a second lens having a positive refractive power; a third lens having a negative refractive power; a fourth lens having a convex image-side surface; a fifth lens having an object-side surface and an image-side surface that are concave in a region surrounding an optical axis of the photographing lenses; and a sixth lens having an image-side surface that is concave in a region surrounding the optical axis of the photographing lenses, wherein the first lens to sixth lens are sequentially arranged in a direction from an object side to an image side.

BRIEF DESCRIPTION OF THE DRAWINGS

These and/or other aspects will become better understood and more readily appreciated by a person of ordinary skill in the art from the following description of the embodiments, taken in conjunction with the accompanying drawings in which.

DETAILED DESCRIPTION

Figure 1:
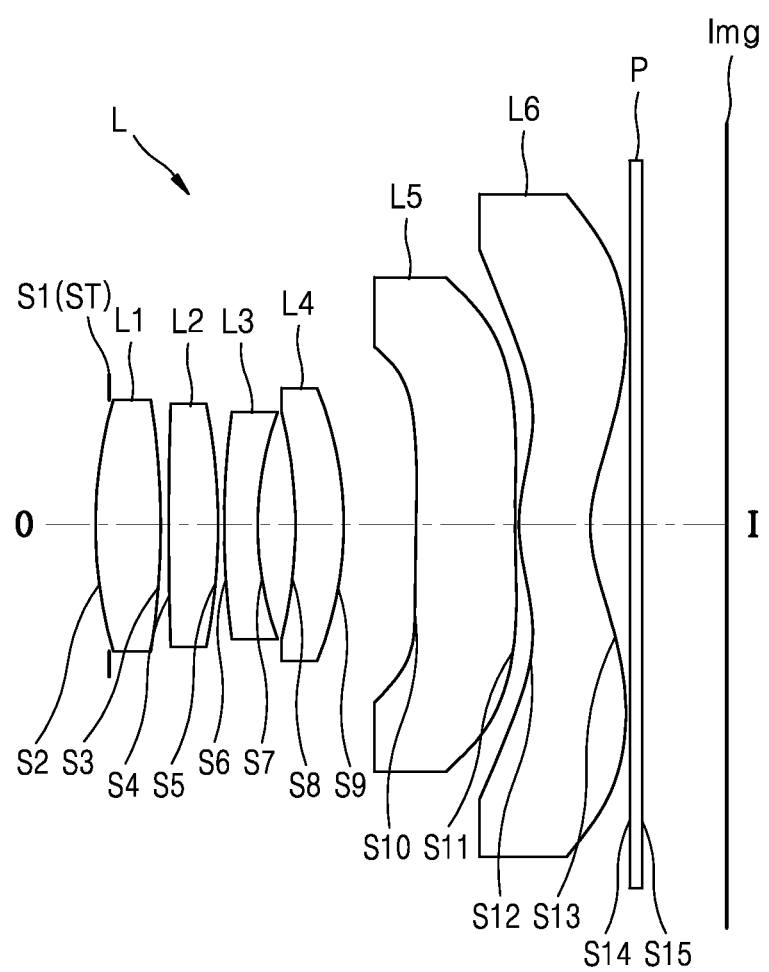
FIG. 1 illustrates photographing lenses according to a first embodiment.

Reference will now be made in detail to embodiments, examples of which are illustrated in the accompanying drawings, wherein like reference numerals refer to like elements throughout. In this regard, the present embodiments may have different forms and the appended claims cannot be construed as being limited to the descriptions set forth herein. Accordingly, the embodiments are merely described below, by referring to the figures, to explain aspects of the disclosure. As used herein, the term "and/or" includes any and all combinations of one or more of the associated listed items. Expressions such as "at least one of," when preceding a list of elements, modify the entire list of elements and do not modify the individual elements of the list.

A plurality of photographing lenses arranged with various lens structures, and a photographing apparatus including the plurality of photographing lenses arranged therein will now be described according to embodiments with reference to the accompanying drawings.

FIG. 1 illustrates photographing lenses L according to an embodiment.

Referring now to FIG. 1, the plurality of photographing lenses (collectively referred to as "L") may include a first lens L1 having a positive refractive power, a second lens L2 having a positive refractive power, a third lens L3 having a negative refractive power, a fourth lens L4, a fifth lens L5, and a sixth lens L6, and the first lens to sixth lens L1 to L6 may be sequentially arranged in a direction from an object side O to an image side I.

For example, the fourth lens L4 may have a positive refractive power. For example, the fifth lens L5 may have a negative refractive power. The sixth lens L6 may have a negative refractive power or a positive refractive power.

The first lens L1 may have a convex object-side surface S2. For example, the first lens L1 may be a double convex lens or a meniscus lens. For example, the second lens L2 may have a convex image-side surface S5. The second lens L2 may be a double convex lens.

The third lens L3 may have a concave image-side surface S7. The third lens L3 may be a meniscus lens. The fourth lens L4 may have a convex image-side surface S9. For example, the fourth lens L4 may be a meniscus lens.

For example, the fifth lens L5 may have an object-side surface S10 and an image-side surface S11 and which are concave in a region around (i.e. surrounding) an optical axis of the photographing lenses L (in a region located around the optical axis within a predetermined radius). For example, at least one of the object-side surface S10 and the image-side surface S11 of the fifth lens L5 may have at least one inflection point. Herein, the term "inflection point" may refer to a point at which the sign of the radius of curvature of a lens surface changes from positive (+) to negative (−), or from negative (−) to positive (+).

In addition, the term "reflection point" may refer to a point at which the shape of a lens surface changes from convex to concave, or from concave to convex. Continuing to refer to FIG. 1, The image-side surface S11 of the fifth lens L5 may be concave in a region around the optical axis of the photographing lenses L and convex in a direction away from the optical axis of the photographing lenses L.

At least one of an object-side surface S12 and an image-side surface S13 of the sixth lens L6 may have at least one inflection point. For example, the object-side surface S12 of the sixth lens L6 may be convex in a region around the optical axis of the photographing lenses and concave in a direction away from the optical axis of the photographing lenses L. The image-side surface S13 of the sixth lens L6 may be concave in a region around the optical axis of the photographing lenses L and convex in a direction away from the optical axis of the photographing lenses L.

An object image may pass through the first lens L1, the second lens L2, the third lens L3, the fourth lens L4, the fifth lens L5, and the sixth lens L6, and may then be incident on an image plane IMG. For example, the image plane IMG may be a surface of an imaging device or an image sensor.

At least one optical filter P may be disposed between the sixth lens L6 and the image plane IMG. The optical filter P may include at least one of low-pass filters, infrared (IR)-cut filters, and cover glass. If the optical filter P includes an IR-cut filter, visible light may pass through the optical filter P but infrared rays may not pass through the optical filter P. Thus, infrared rays may not reach the image plane IMG. However, the photographing lenses L may not include an optical filter.

The photographing lenses L may include an aperture stop ST. The aperture stop ST may be disposed at a position between the object-side surface S2 of the first lens L1 and the third lens L3. For example, the aperture stop ST may be disposed on the object-side surface S2 of the first lens L1. However, the position of the aperture stop ST is not limited thereto. In another example, the aperture stop ST may be disposed between the first lens L1 and the second lens L2. In another example, the aperture stop ST may be disposed between the second lens L2 and the third lens L3.

Each of the first lens to sixth lens L1 to L6 may have at least one aspheric surface. For example, each of the first lens to sixth lens L1 to L6 may be a double aspheric lens. In this case, the photographing lenses L may have compact and high-resolution characteristics. In addition, at least one of the first lens to sixth lenses L1 to L6 may be formed of a plastic material. In this case, the manufacturing costs of the photographing lenses L may be decreased, and aspheric surfaces may be easily formed on a plastic material.

In the embodiment, the photographing lenses L may satisfy the following Formulas 1 and 2:

$$|R2/R1|>1 \qquad \text{<Formula 1>}$$

$$0<f3/f5<1 \qquad \text{<Formula 2>}$$

In Formulas 1 and 2, R1 denotes the radius of curvature of the object-side surface S2 of the first lens L1, R2 denotes the radius of curvature of an image-side surface S3 of the first lens L1, f3 denotes the focal length of the third lens L3, and f5 denotes the focal length of the fifth lens L5.

Formula 1 describes the ratio of the radius of curvature of the image-side surface S3 to the radius of curvature of the object-side surface S2 of the first lens L1. If |R2/R1| is equal to or less than the lower limit in Formula 1, it may be difficult to manufacture the photographing lenses L in a thin shape, and the distortion aberration of the photographing lenses L may increase.

Formula 2 describes a relationship between the refractive power of the third lens L3 and the refractive power of the fifth lens L5. When (f3/f5) satisfies Formula 2, chromatic aberration may be properly corrected, and the photographing lenses L may be less sensitively affected by manufacturing conditions or environments.

In the embodiment, the photographing lenses L may satisfy the following Formula 3:

$$0<R12/R10<1 \qquad \text{<Formula 3>}$$

In Formula 3, R10 denotes the radius of curvature of the image-side surface S11 of the fifth lens L5, and R12 denotes the radius of curvature of the image-side surface S13 of the sixth lens L6. Formula 3 describes the ratio of the radius of curvature of the image-side surface S13 of the sixth lens L6 to the radius of curvature of the image-side surface S11 of the fifth lens L5. If (R12/R10) satisfies Formula 3, all kinds of aberration may be easily corrected at a high image height, and the exit angle of main rays may be easily controlled.

In the embodiment, the photographing lenses L may satisfy the following Formula 4:

$$|f/f5|+|f/f6|<1 \qquad \text{<Formula 4>}$$

In Formula 4, f denotes the focal length of the photographing lenses L, f5 denotes the focal length of the fifth lens L5, and f6 denotes the focal length of the sixth lens L6. Formula 4 describes a relationship between the refractive power of the fifth lens L5 and the refractive power of the sixth lens L6. When (|f/f5|+|f/f6|) satisfies Formula 4, chromatic aberration may easily be corrected, and the photographing lenses L may easily be manufactured.

In the embodiment, the photographing lenses L may satisfy the following Formula 5:

$$(f1+f2)/2>f12 \qquad \text{<Formula 5>}$$

In Formula 5, f1 denotes the focal length of the first lens L1, f2 denotes the focal length of the second lens L2, and f12 denotes the composite focal length of the first and second lenses L1 and L2. Formula 5 describes a relationship between the refractive power of the first lens L1 and the refractive power of the second lens L2. If the first and second lenses L1 and L2 satisfy Formula 5, all kinds of aberration may be easily corrected by controlling the image height of incident rays, and the photographing lenses L may be less sensitively affected by manufacturing conditions or environments.

In the descriptions of photographing lenses according to the embodiments of the present disclosure, the term "aspheric" or "aspheric surface" has the following definition.

When an optical axis is set as a z-axis, a direction perpendicular to the optical axis is set as a y-axis, and the propagation direction of rays is denoted as a positive direction, an aspheric surface of a lens may be defined by the following Formula 6. In Formula 6, Z denotes a distance measured from the vertex of a lens in the direction of the optical axis of the lens, Y denotes a distance measured from the optical axis in a direction perpendicular to the optical axis, K denotes a conic constant, A, B, C, D, E, and F denote aspheric coefficients, and c denotes the reciprocal (1/R) of the radius of curvature at the vertex of the lens.

$$Z = \frac{cY^2}{1+\sqrt{1-(1+K)c^2Y^2}} + AY^4 + BY^6 + CY^8 + DY^{10} + EY^{12} + FY^{14} + \ldots \qquad \text{<Formula 6>}$$

Embodiments disclosed herein may provide variously designed photographing lenses as described below.

In the following embodiments, lens surfaces are sequentially numbered with S1, S2, S3, S4, ..., Sn in a direction from an object side O to an image side I.

<First Embodiment>

FIG. 1 illustrates the photographing lenses L according to a first embodiment, and design data for the photographing lenses L of the first embodiment is as follows.

In the first embodiment, the F-number of the photographing lenses L is 2.27, the half angle of view of the photographing lenses L is 37°, the focal length F of the photographing lenses L is 4.58 mm, the focal length f3 of the third lens L3 is −5.59 mm, the focal length f5 of the fifth lens L5 is −16.42 mm, and the focal length f6 of the sixth lens L6 is −9.95 mm.

TABLE 1

| Lens surfaces | Radius of curvature | Thickness or air gap | Refractive power | Abbe number |
|---|---|---|---|---|
| S1 (ST) | infinity | −0.150 | | |
| S2 | 1.940 | 0.387 | 1.544 | 56 |
| S3 | 2.648 | 0.069 | | |
| S4 | 2.429 | 0.516 | 1.544 | 56 |
| S5 | −11.300 | 0.050 | | |
| S6 | 7.655 | 0.269 | 1.642 | 22 |
| S7 | 2.425 | 0.273 | | |
| S8 | −22.010 | 0.588 | 1.64 | 23 |
| S9 | −6.490 | 0.518 | | |
| S10 | −13.099 | 0.645 | 1.642 | 22 |
| S11 | 57.894 | 0.180 | | |
| S12 | 2.821 | 0.734 | 1.535 | 56 |
| S13 | 1.678 | 0.241 | | |
| S14 | infinity | 0.110 | 1.514 | 55 |
| S15 | infinity | 0.705 | | |
| Img | infinity | 0.015 | | |

Table 2 below shows aspheric coefficients in the first embodiment.

TABLE 2

| Lens surfaces | K | A | B | C | D | E | F | G |
|---|---|---|---|---|---|---|---|---|
| S2 | −1.5653E+00 | −2.4796E−02 | 5.2381E−03 | −8.3233E−02 | 1.2865E−01 | −1.2529E−01 | 7.2813E−02 | −1.75E−02 |
| S3 | −6.8288E+00 | −1.0064E−01 | 4.4105E−02 | −8.2462E−02 | 2.7452E−01 | −3.7157E−01 | 2.4350E−01 | −6.45E−02 |
| S4 | −1.2830E+00 | −8.1322E−02 | 9.9890E−02 | −1.4741E−01 | 4.3923E−01 | −6.1359E−01 | 4.1225E−01 | −1.13E−01 |
| S5 | −2.0000E+02 | −1.0386E−01 | 4.0411E−01 | −9.5255E−01 | 1.3484E+00 | −1.2252E+00 | 6.7864E−01 | −1.74E−01 |
| S6 | 4.8086E+01 | −1.5493E−01 | 4.9946E−01 | −1.0973E+00 | 1.5540E+00 | −1.4573E+00 | 8.5416E−01 | −2.34E−01 |
| S7 | −1.2417E+01 | 1.8169E−02 | 9.8087E−02 | −8.5028E−02 | 2.9541E−02 | 6.3790E−02 | −5.8958E−02 | 2.58E−02 |
| S8 | −1.2955E+02 | −6.1121E−02 | −2.9976E−02 | 1.4968E−01 | −2.0837E−01 | 1.6038E−01 | −4.4394E−02 | −1.26E−02 |
| S9 | 1.4242E+01 | −2.8063E−02 | −4.6305E−02 | 1.1953E−01 | −1.1862E−01 | 8.3891E−02 | −3.1770E−02 | 3.93E−03 |
| S10 | −2.0000E+02 | −2.0806E−03 | −9.4485E−02 | 6.1219E−02 | −2.1303E−02 | 5.0686E−03 | −4.8778E−04 | −4.02E−05 |
| S11 | −2.0000E+02 | −7.9153E−03 | −1.6871E−02 | 2.4755E−03 | 2.3338E−03 | −1.0693E−03 | 1.9046E−04 | −1.36E−05 |
| S12 | −1.6998E+01 | −1.3293E−01 | 6.8390E−02 | −2.8301E−02 | 7.7720E−03 | −1.2031E−03 | 9.5951E−05 | −3.23E−06 |
| S13 | −6.8687E+00 | −7.0632E−02 | 2.7401E−02 | −8.2959E−03 | 1.6758E−03 | −2.1717E−04 | 1.6001E−05 | −4.95E−07 |

Figure 2:
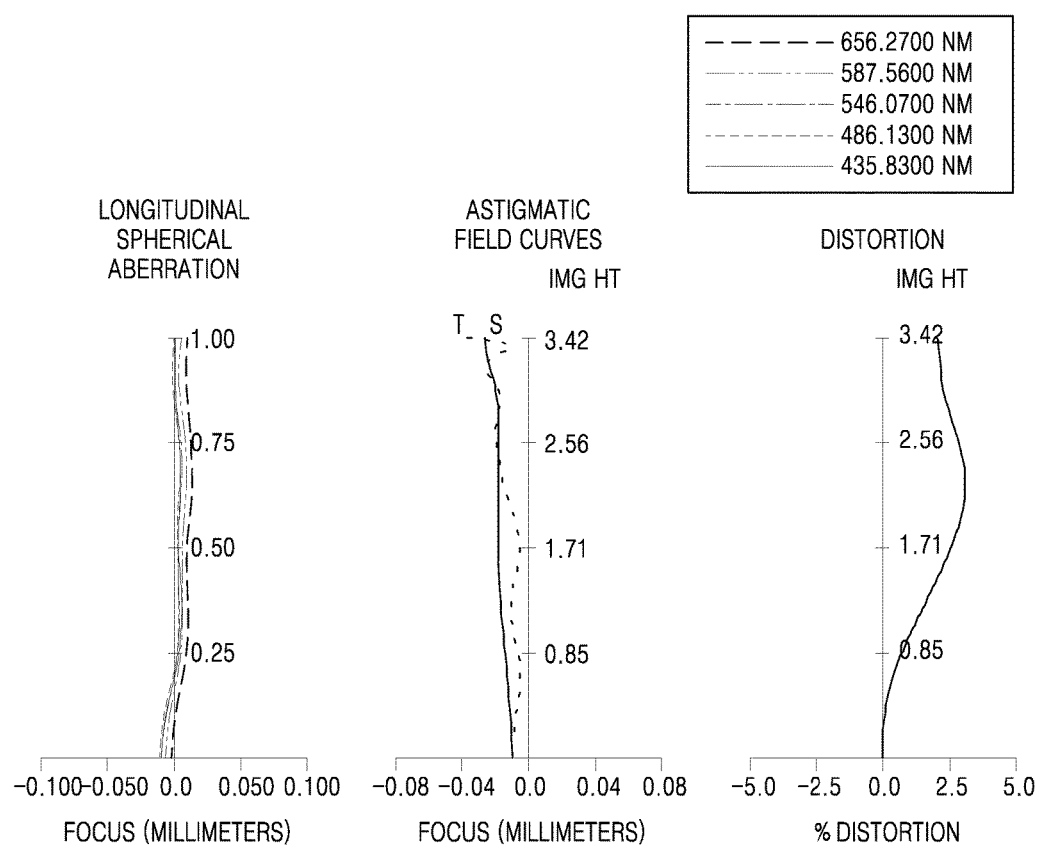
FIG. 2 illustrates aberration diagrams of the photographing lenses of the first embodiment.

FIG. 2 illustrates longitudinal spherical aberration, astigmatic field curves, and distortion of the photographing lenses L of the first embodiment. The astigmatic field curves include a tangential field curvature T and a sagittal field curvature S.

<Second Embodiment>

Figure 3:
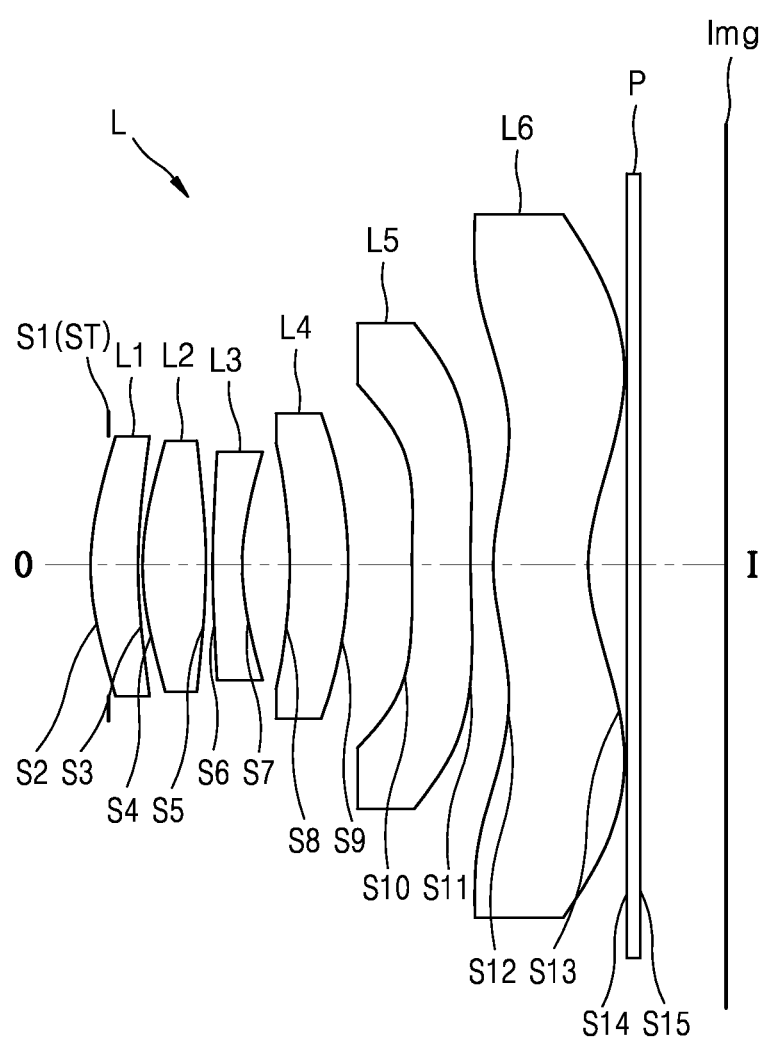
FIG. 3 illustrates photographing lenses according to a second embodiment.

FIG. 3 illustrates photographing lenses L according to a second embodiment, and design data for the photographing lenses L of the second embodiment as follows.

In the second embodiment, the F-number of the photographing lenses L is 2.11, the half angle of view of the photographing lenses L is 38°, the focal length F of the photographing lenses L is 4.46 mm, the focal length f3 of the third lens L3 is −5.55 mm, the focal length f5 of the fifth lens L5 is −10.29 mm, and the focal length f6 of the sixth lens L6 is −87.14 mm.

TABLE 3

| Lens surfaces | Radius of curvature | Thickness or air gap | Refractive power | Abbe number |
|---|---|---|---|---|
| S1 (ST) | infinity | −0.150 | | |
| S2 | 2.050 | 0.394 | 1.544 | 56 |
| S3 | 2.902 | 0.051 | | |
| S4 | 2.724 | 0.523 | 1.544 | 56 |
| S5 | −7.849 | 0.050 | | |
| S6 | 7.754 | 0.250 | 1.642 | 22 |
| S7 | 2.427 | 0.385 | | |
| S8 | −12.404 | 0.504 | 1.64 | 23 |
| S9 | −5.422 | 0.522 | | |
| S10 | −7.629 | 0.493 | 1.642 | 22 |
| S11 | 54.348 | 0.187 | | |
| S12 | 1.820 | 0.785 | 1.535 | 56 |
| S13 | 1.488 | 0.326 | | |
| S14 | infinity | 0.110 | 1.514 | 55 |
| S15 | infinity | 0.700 | | |
| Img | infinity | 0.020 | | |

Table 4 below shows aspheric coefficients in the second embodiment.

TABLE 4

| Lens surfaces | K | A | B | C | D | E | F | G |
|---|---|---|---|---|---|---|---|---|
| S2 | −1.5322E+00 | −2.4123E−02 | 6.3359E−03 | −8.4106E−02 | 1.2771E−01 | −1.2462E−01 | 7.4012E−02 | −1.8617E−02 |
| S3 | −7.2256E+00 | −1.0188E−01 | 4.3855E−02 | −8.1594E−02 | 2.7505E−01 | −3.7237E−01 | 2.4312E−01 | −6.4500E−02 |
| S4 | −1.4722E+00 | −8.2569E−02 | 9.7650E−02 | −1.5022E−01 | 4.3744E−01 | −6.1360E−01 | 4.1376E−01 | −1.1269E−01 |
| S5 | −1.6601E+02 | −1.0645E−01 | 4.0205E−01 | −9.5331E−01 | 1.3472E+00 | −1.2266E+00 | 6.7865E−01 | −1.7073E−01 |
| S6 | 4.6984E+01 | −1.5497E−01 | 4.9744E−01 | −1.1007E+00 | 1.5526E+00 | −1.4553E+00 | 8.5799E−01 | −2.3285E−01 |
| S7 | −1.3192E+01 | 1.4325E−02 | 9.2356E−02 | −9.0947E−02 | 2.5995E−02 | 6.0988E−02 | −6.1153E−02 | 2.5828E−02 |
| S8 | 5.4470E+01 | −6.3045E−02 | −3.1066E−02 | 1.4347E−01 | −2.1379E−01 | 1.5956E−01 | −4.1036E−02 | −9.8014E−03 |

TABLE 4-continued

| Lens surfaces | K | A | B | C | D | E | F | G |
|---|---|---|---|---|---|---|---|---|
| S9 | 1.3059E+01 | −3.7140E−02 | −4.9236E−02 | 1.1761E−01 | −1.2007E−01 | 8.3231E−02 | −3.1652E−02 | 4.7465E−03 |
| S10 | −2.0000E+02 | 6.9854E−03 | −1.0193E−01 | 6.0832E−02 | −2.1398E−02 | 4.8361E−03 | −6.0208E−04 | −4.1337E−05 |
| S11 | 2.0000E+02 | −1.4480E−02 | −1.6656E−02 | 2.1631E−03 | 2.3262E−03 | −1.0617E−03 | 1.9106E−04 | −1.4154E−05 |
| S12 | −6.2915E+00 | −1.3371E−01 | 6.7926E−02 | −2.8416E−02 | 7.7662E−03 | −1.2016E−03 | 9.6380E−05 | −3.1324E−06 |
| S13 | −4.6074E+00 | −7.0888E−02 | 2.7350E−02 | −8.3299E−03 | 1.6769E−03 | −2.1667E−04 | 1.5990E−05 | −4.9628E−07 |

Figure 4:
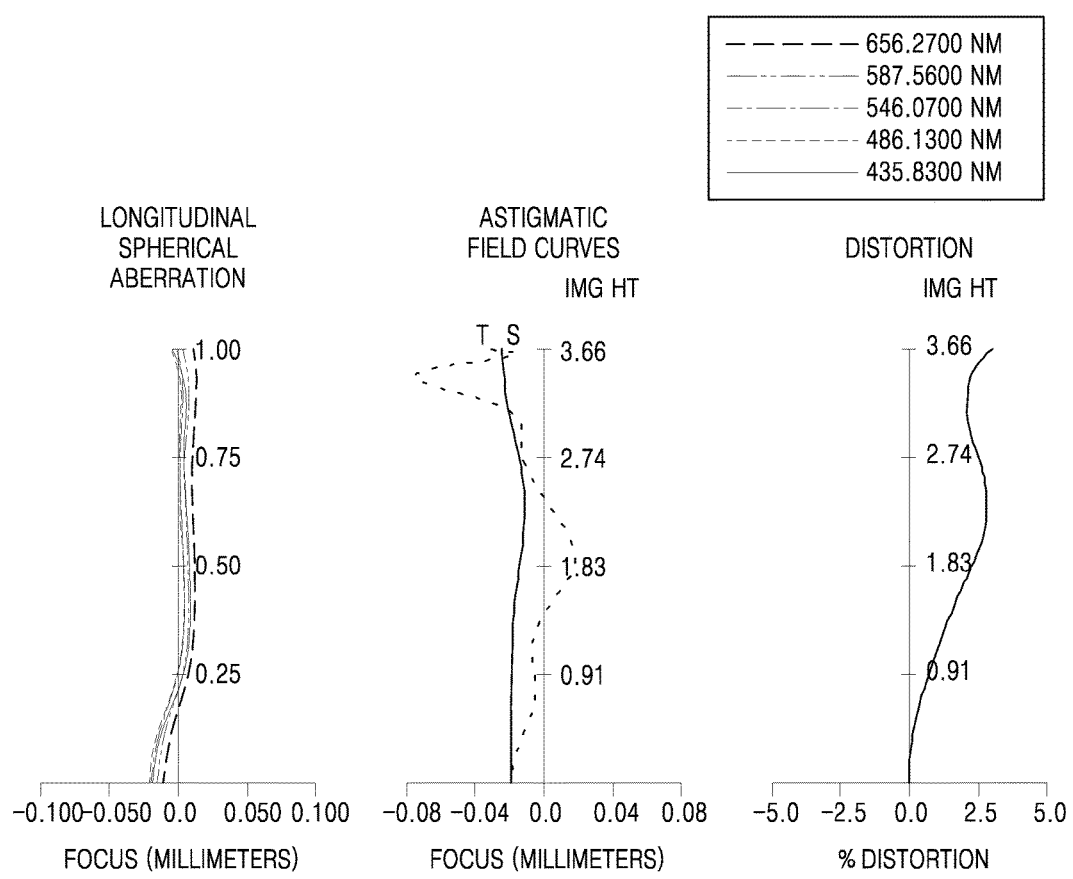
FIG. 4 illustrates aberration diagrams of the photographing lenses of the second embodiment.

FIG. 4 illustrates examples of longitudinal spherical aberration, astigmatic field curves, and distortion of the photographing lenses L of the second embodiment.

<Third Embodiment>

Figure 5:
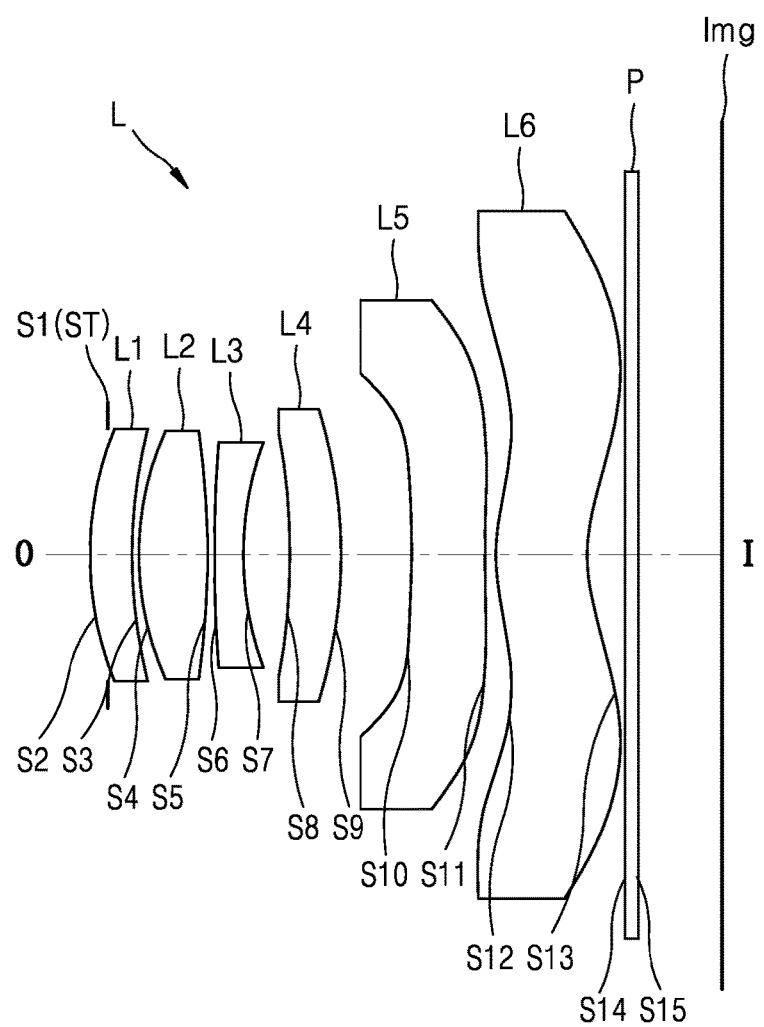
FIG. 5 illustrates photographing lenses according to a third embodiment.

FIG. 5 illustrates photographing lenses L according to a third embodiment, and design data for the photographing lenses L of the third embodiment is as follows.

In the third embodiment, the F-number of the photographing lenses L is 2.11, the half angle of view of the photographing lenses L is 38°, the focal length F of the photographing lenses L is 4.53 mm, the focal length f3 of the third lens L3 is −5.38 mm, the focal length f5 of the fifth lens L5 is −10.6 mm, and the focal length f6 of the sixth lens L6 is −45.16 mm.

Figure 6:
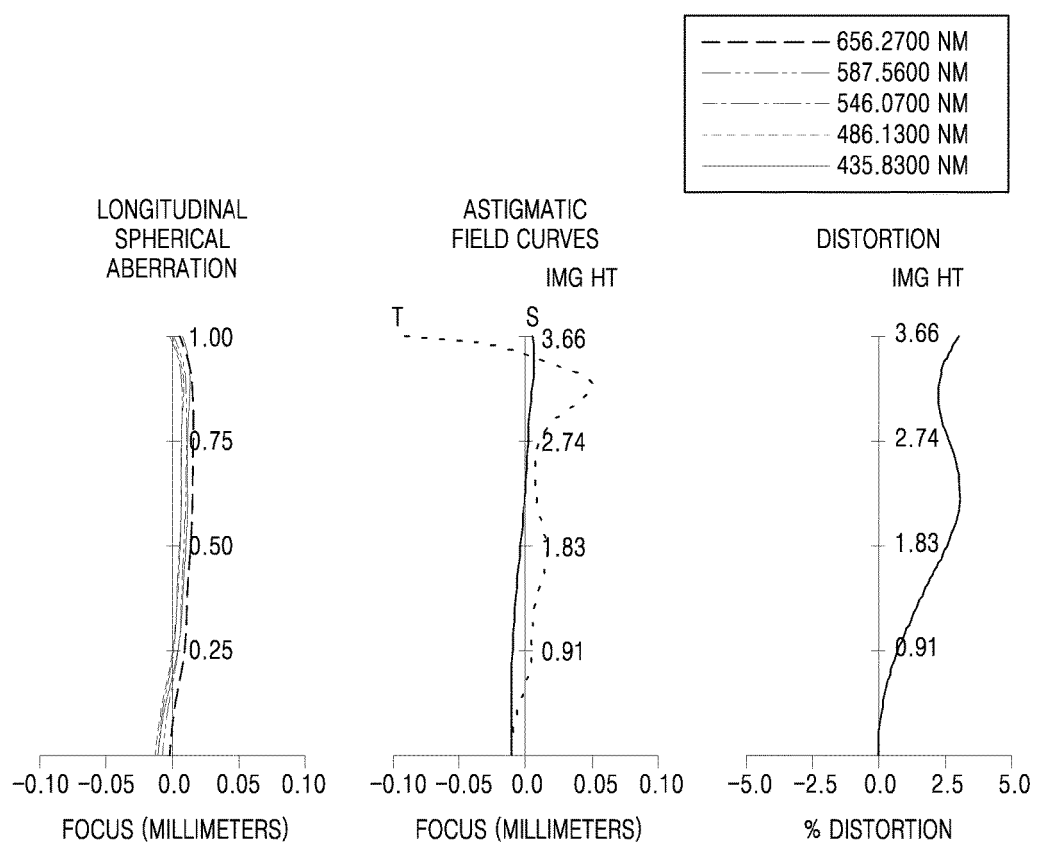
FIG. 6 illustrates aberration diagrams of the photographing lenses of the third embodiment.

FIG. 6 illustrates longitudinal spherical aberration, astigmatic field curves, and distortion of the photographing lenses L of the third embodiment.

<Fourth Embodiment>

Figure 7:
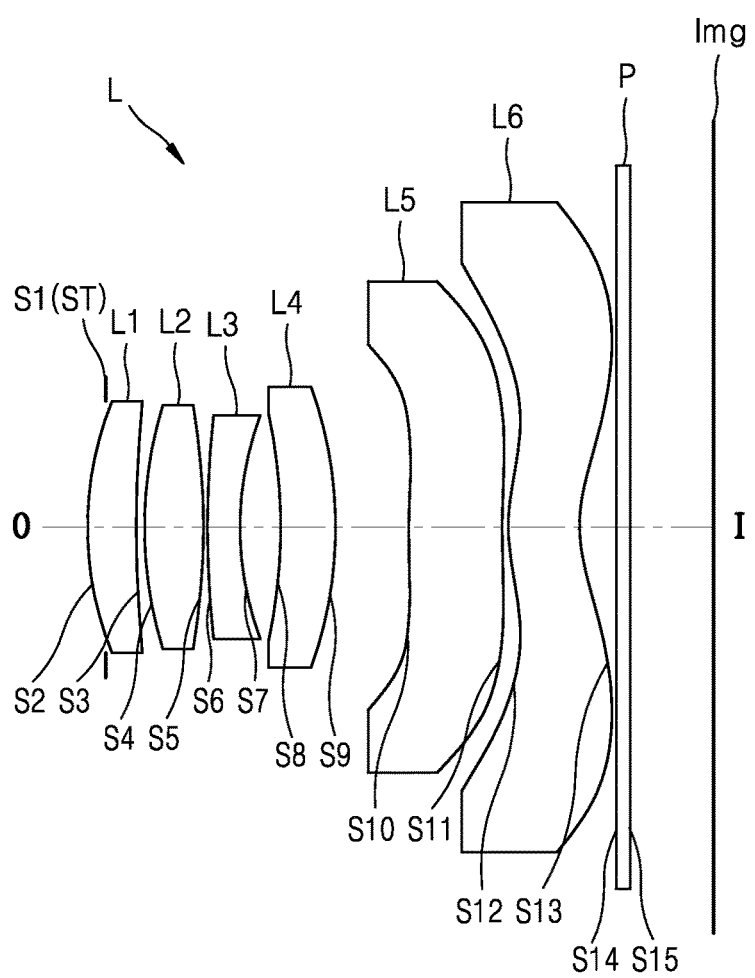
FIG. 7 illustrates photographing lenses according to a fourth embodiment.

FIG. 7 illustrates photographing lenses L according to a fourth embodiment, and design data for the photographing lenses L of the fourth embodiment is as follows.

In the fourth embodiment, the F-number of the photographing lenses L is 2.09, the half angle of view of the photographing lenses L is 36°, the focal length F of the photographing lenses L is 4.43 mm, the focal length f3 of the third lens L3 is −5.75 mm, the focal length f5 of the fifth lens L5 is −65.16 mm, and the focal length f6 of the sixth lens L6 is −12.87 mm.

TABLE 5

| Lens surfaces | Radius of curvature | Thickness or air gap | Refractive power | Abbe number |
|---|---|---|---|---|
| S1 (ST) | infinity | −0.150 | | |
| S2 | 2.065 | 0.353 | 1.544 | 56 |
| S3 | 2.100 | 0.050 | | |
| S4 | 1.999 | 0.593 | 1.544 | 56 |
| S5 | −7.933 | 0.050 | | |
| S6 | 7.663 | 0.251 | 1.642 | 22 |
| S7 | 2.365 | 0.389 | | |
| S8 | −14.932 | 0.439 | 1.64 | 23 |
| S9 | −5.601 | 0.599 | | |
| S10 | −7.629 | 0.619 | 1.642 | 22 |
| S11 | 71.576 | 0.099 | | |
| S12 | 1.859 | 0.765 | 1.535 | 56 |
| S13 | 1.478 | 0.317 | | |
| S14 | infinity | 0.110 | 1.514 | 55 |
| S15 | infinity | 0.708 | | |
| Img | infinity | 0.011 | | |

TABLE 7

| Lens surfaces | Radius of curvature | Thickness or air gap | Refractive power | Abbe number |
|---|---|---|---|---|
| S1 (ST) | infinity | −0.150 | | |
| S2 | 2.132 | 0.403 | 1.544 | 56 |
| S3 | 3.237 | 0.061 | | |
| S4 | 2.748 | 0.501 | 1.544 | 56 |
| S5 | −9.557 | 0.050 | | |
| S6 | 7.282 | 0.276 | 1.651 | 22 |
| S7 | 2.452 | 0.342 | | |
| S8 | −9.725 | 0.459 | 1.544 | 56 |
| S9 | −5.672 | 0.623 | | |
| S10 | −136.311 | 0.793 | 1.651 | 22 |
| S11 | 62.712 | 0.054 | | |
| S12 | 1.863 | 0.600 | 1.535 | 56 |
| S13 | 1.302 | 0.307 | | |
| S14 | infinity | 0.110 | 1.514 | 55 |
| S15 | infinity | 0.712 | | |
| Img | infinity | 0.010 | | |

Table 6 below shows aspheric coefficients in the third embodiment.

Table 4 below shows examples of aspheric coefficients in the fourth embodiment.

TABLE 6

| Lens surfaces | K | A | B | C | D | E | F | G |
|---|---|---|---|---|---|---|---|---|
| S2 | −2.2472E+00 | −2.8151E−02 | 1.2112E−02 | −8.4399E−02 | 1.2630E−01 | −1.2495E−01 | 7.4378E−02 | −1.8562E−02 |
| S3 | −6.3923E+00 | −1.0389E−01 | 3.8465E−02 | −8.5611E−02 | 2.7415E−01 | −3.7194E−01 | 2.4424E−01 | −6.4500E−02 |
| S4 | −2.1095E+00 | −8.7002E−02 | 9.7606E−02 | −1.4910E−01 | 4.3698E−01 | −6.1381E−01 | 4.1519E−01 | −1.1269E−01 |
| S5 | −1.9991E+02 | −1.0414E−01 | 4.0747E−01 | −9.4847E−01 | 1.3457E+00 | −1.2306E+00 | 6.7656E−01 | −1.6868E−01 |
| S6 | 5.0546E+01 | −1.6026E−01 | 4.9431E−01 | −1.1048E+00 | 1.5495E+00 | −1.4580E+00 | 8.5533E−01 | −2.3389E−01 |
| S7 | −1.4658E+01 | 2.7868E−02 | 8.2096E−02 | −1.0446E−01 | 3.2017E−02 | 7.2840E−02 | −7.4011E−02 | 2.5823E−02 |
| S8 | 2.9342E+01 | −5.9846E−02 | −3.3763E−02 | 1.5001E−01 | −2.1229E−01 | 1.5459E−01 | −4.4216E−02 | −3.7309E−03 |
| S9 | 1.3843E+01 | −3.4102E−02 | −4.6299E−02 | 1.1637E−01 | −1.2078E−01 | 8.3574E−02 | −3.1303E−02 | 4.6243E−03 |
| S10 | −1.9009E+02 | 1.8456E−02 | −9.3790E−02 | 5.8552E−02 | −2.2905E−02 | 4.9196E−03 | −4.7544E−04 | −2.3088E−05 |
| S11 | 2.0000E+02 | 4.9709E−03 | −1.8963E−02 | 1.8163E−03 | 2.3057E−03 | −1.0575E−03 | 1.9345E−04 | −1.3635E−05 |
| S12 | −6.3021E+00 | −1.3297E−01 | 6.7678E−02 | −2.8429E−02 | 7.7699E−03 | −1.2008E−03 | 9.6435E−05 | −3.1526E−06 |
| S13 | −4.8314E+00 | −7.0605E−02 | 2.7192E−02 | −8.3255E−03 | 1.6785E−03 | −2.1657E−04 | 1.5991E−05 | −4.9756E−07 |

TABLE 8

| Lens surfaces | K | A | B | C | D | E | F | G |
|---|---|---|---|---|---|---|---|---|
| S2 | −1.7561E+00 | −2.5965E−02 | 7.6214E−03 | −8.6332E−02 | 1.2652E−01 | −1.2460E−01 | 7.4868E−02 | −1.8808E−02 |
| S3 | −1.1966E+01 | −1.0601E−01 | 4.1048E−02 | −8.6272E−02 | 2.7300E−01 | −3.7234E−01 | 2.4507E−01 | −6.4500E−02 |
| S4 | −2.2897E+00 | −8.6416E−02 | 9.5445E−02 | −1.4882E−01 | 4.3732E−01 | −6.1418E−01 | 4.1366E−01 | −1.1269E−01 |
| S5 | −2.0000E+02 | −1.0700E−01 | 4.0574E−01 | −9.4855E−01 | 1.3446E+00 | −1.2325E+00 | 6.7555E−01 | −1.6693E−01 |
| S6 | 4.7412E+01 | −1.5224E−01 | 4.9337E−01 | −1.1061E+00 | 1.5501E+00 | −1.4563E+00 | 8.5575E−01 | −2.3765E−01 |
| S7 | −1.4954E+01 | 3.3942E−02 | 8.1864E−02 | −1.0584E−01 | 3.5465E−02 | 7.6756E−02 | −7.5862E−02 | 2.5827E−02 |
| S8 | 7.5455E+01 | −8.1911E−02 | −2.4879E−02 | 1.5406E−01 | −2.1252E−01 | 1.5626E−01 | −4.0016E−02 | −1.9868E−03 |
| S9 | 1.9199E+01 | −6.2204E−02 | −3.8730E−02 | 1.1830E−01 | −1.2009E−01 | 8.4275E−02 | −3.0834E−02 | 5.0677E−03 |
| S10 | −2.0000E+02 | 2.6601E−02 | −1.0140E−01 | 6.1440E−02 | −2.3132E−02 | 4.7681E−03 | −4.6534E−04 | 1.4150E−05 |
| S11 | 2.0000E+02 | −3.5366E−04 | −2.1499E−02 | 1.7984E−03 | 2.3989E−03 | −1.0505E−03 | 1.9187E−04 | −1.3739E−05 |
| S12 | −7.0358E+00 | −1.5721E−01 | 7.0629E−02 | −2.8309E−02 | 7.7617E−03 | −1.2033E−03 | 9.6151E−05 | −3.1600E−06 |
| S13 | −5.0544E+00 | −8.0080E−02 | 2.9463E−02 | −8.4303E−03 | 1.6734E−03 | −2.1695E−04 | 1.5979E−05 | −4.9541E−07 |

Figure 8:
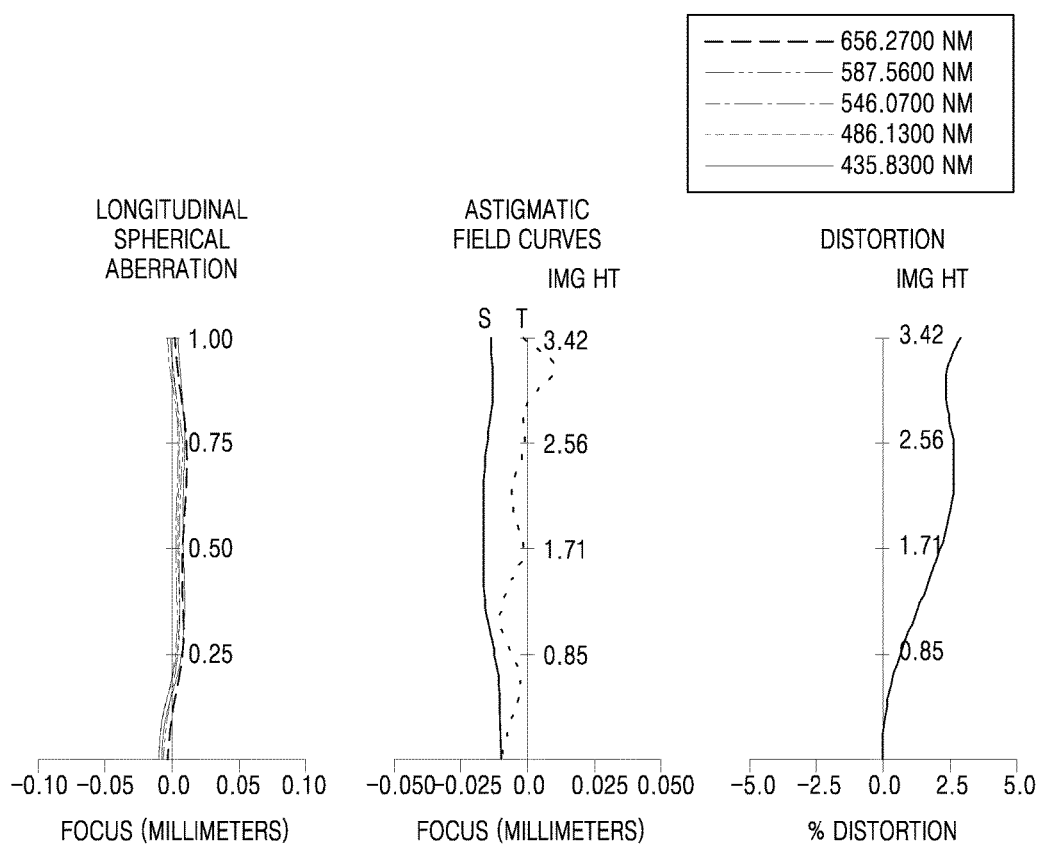
FIG. 8 illustrates aberration diagrams of the photographing lenses of the fourth embodiment.

FIG. 8 illustrates examples of longitudinal spherical aberration, astigmatic field curves, and distortion of the photographing lenses L of the fourth embodiment.

<Fifth Embodiment>

Figure 9:
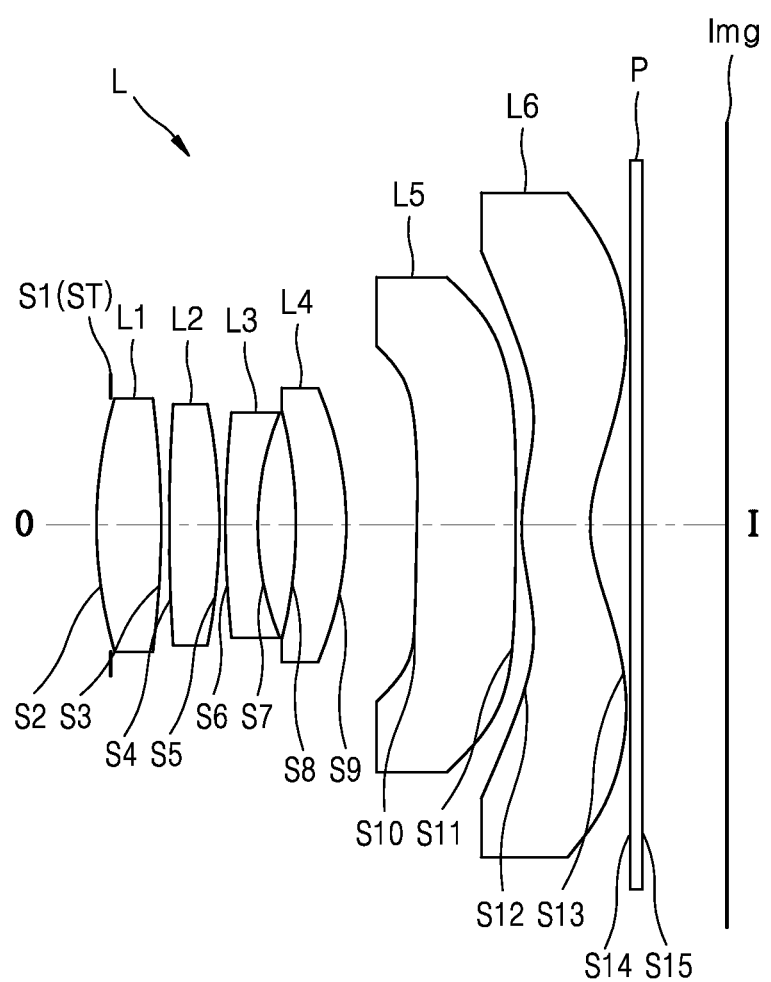
FIG. 9 illustrates photographing lenses according to a fifth embodiment.

FIG. 9 illustrates photographing lenses L according to a fifth embodiment, and design data for the photographing lenses L of the fifth embodiment is as follows.

In the fifth embodiment, the F-number of the photographing lenses L is 2.07, the half angle of view of the photographing lenses L is 37°, the focal length F of the photographing lenses L is 4.44 mm, the focal length f3 of the third lens L3 is −6.03 mm, the focal length f5 of the fifth lens L5 is −52.29 mm, and the focal length f6 of the sixth lens L6 is −16.68 mm.

TABLE 9

| Lens surfaces | Radius of curvature | Thickness or air gap | Refractive power | Abbe number |
|---|---|---|---|---|
| S1 (ST) | infinity | −0.120 | | |
| S2 | 2.382 | 0.559 | 1.544 | 56 |
| S3 | 100.000 | 0.075 | | |
| S4 | 14.349 | 0.425 | 1.544 | 56 |
| S5 | −6.944 | 0.050 | | |
| S6 | 7.108 | 0.276 | 1.651 | 22 |
| S7 | 2.506 | 0.325 | | |
| S8 | −8.998 | 0.424 | 1.544 | 56 |
| S9 | −5.894 | 0.605 | | |
| S10 | −73.950 | 0.844 | 1.651 | 22 |
| S11 | 64.655 | 0.050 | | |
| S12 | 1.693 | 0.600 | 1.535 | 56 |
| S13 | 1.247 | 0.334 | | |
| S14 | infinity | 0.110 | 1.514 | 55 |
| S15 | infinity | 0.712 | | |
| Img | infinity | 0.010 | | |

Table 10 below shows aspheric coefficients in the fifth embodiment.

Figure 10:
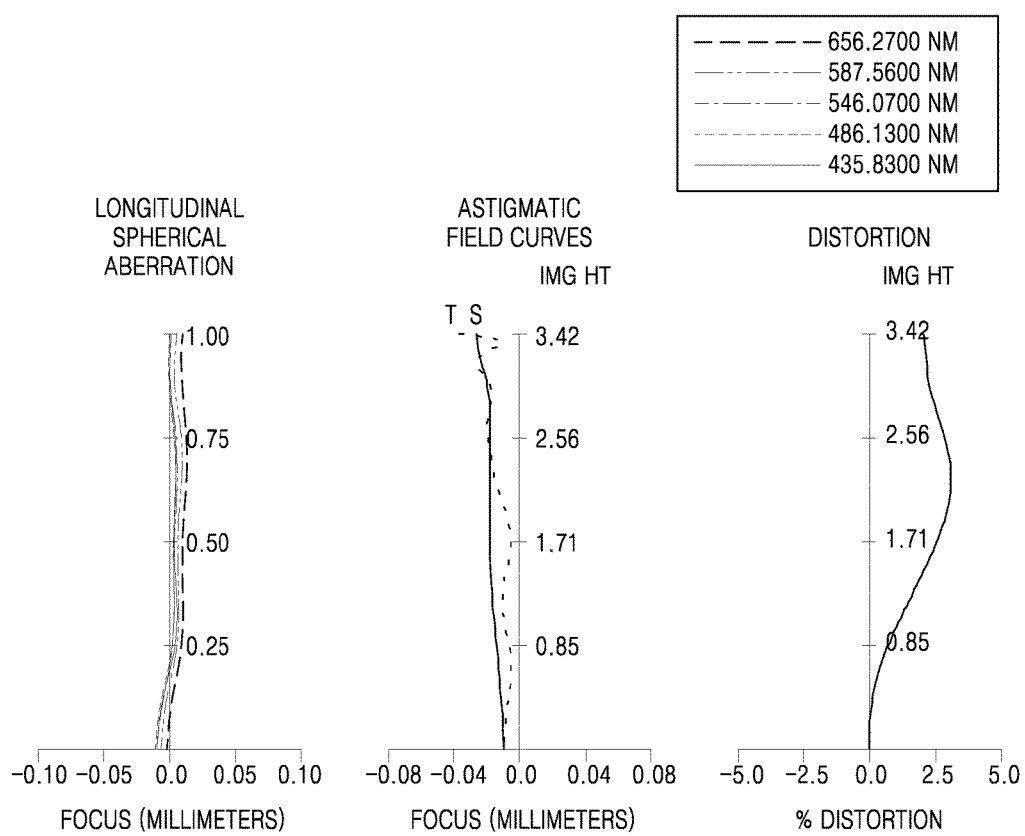
FIG. 10 illustrates aberration diagrams of the photographing lenses of the fifth embodiment.

FIG. 10 illustrates longitudinal spherical aberration, astigmatic field curves, and distortion of the photographing lenses L of the fifth embodiment.

<Sixth Embodiment>

Figure 11:
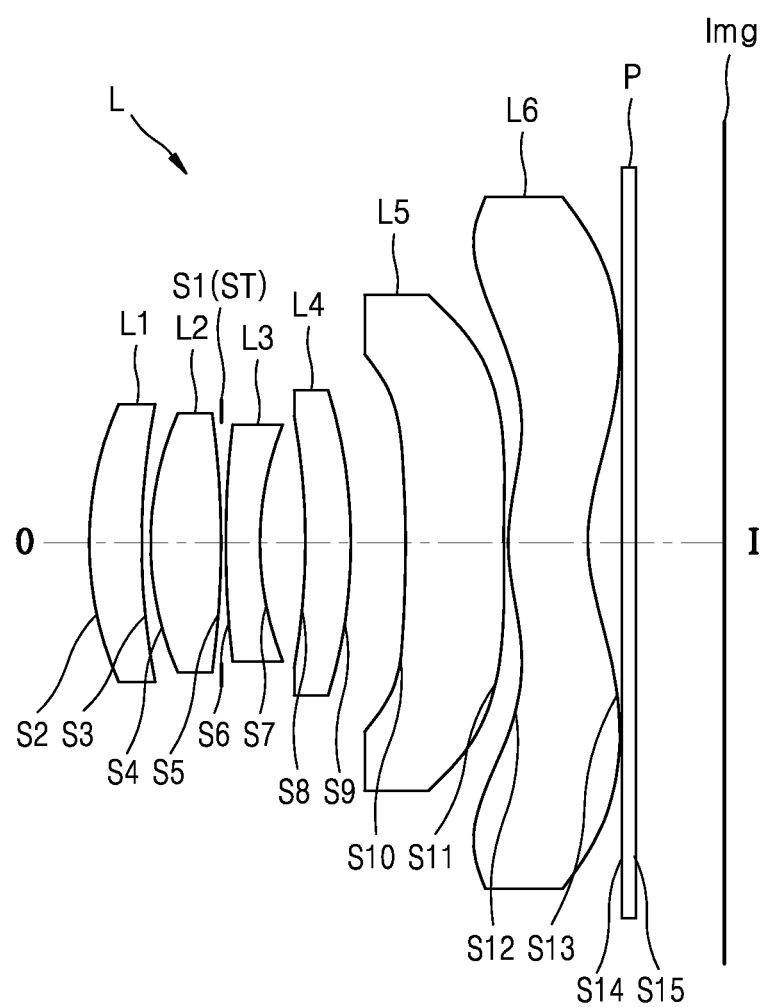
FIG. 11 illustrates photographing lenses according to a sixth embodiment.

FIG. 11 illustrates photographing lenses L according to a sixth embodiment, and design data for the photographing lenses L of the sixth embodiment is as follows.

In the sixth embodiment, the F-number of the photographing lenses L is 1.95, the half angle of view of the photographing lenses L is 37°, the focal length F of the photographing lenses L is 4.35 mm, the focal length f3 of the third lens L3 is −5.50 mm, the focal length f5 of the fifth lens L5 is −66.79 mm, and the focal length f6 of the sixth lens L6 is −21.37 mm.

TABLE 11

| Lens surfaces | Radius of curvature | Thickness or air gap | Refractive power | Abbe number |
|---|---|---|---|---|
| S1 (ST) | infinity | −0.150 | | |
| S2 | 2.047 | 0.430 | 1.544 | 56 |
| S3 | 2.701 | 0.080 | | |
| S4 | 2.192 | 0.568 | 1.544 | 56 |
| S5 | −17.142 | 0.050 | | |
| S6 | 7.574 | 0.269 | 1.651 | 22 |
| S7 | 2.417 | 0.386 | | |
| S8 | −12.870 | 0.371 | 1.651 | 22 |
| S9 | −8.263 | 0.444 | | |
| S10 | −99.417 | 0.808 | 1.544 | 56 |
| S11 | 57.843 | 0.050 | | |
| S12 | 1.952 | 0.645 | 1.535 | 56 |
| S13 | 1.476 | 0.297 | | |
| S14 | infinity | 0.110 | 1.514 | 55 |
| S15 | infinity | 0.710 | | |
| Img | infinity | 0.010 | | |

Table 12 below shows aspheric coefficients in the sixth embodiment.

TABLE 10

| Lens surfaces | K | A | B | C | D | E | F | G |
|---|---|---|---|---|---|---|---|---|
| S2 | −1.5000E+00 | −2.4703E−02 | 5.7656E−03 | −8.7596E−02 | 1.2581E−01 | −1.2477E−01 | 7.5098E−02 | −1.8635E−02 |
| S3 | 2.0000E+02 | −1.0492E−01 | 4.2920E−02 | −8.5670E−02 | 2.7238E−01 | −3.7308E−01 | 2.4558E−01 | −6.4500E−02 |
| S4 | 2.8309E+01 | −8.8590E−02 | 9.6677E−02 | −1.4892E−01 | 4.3732E−01 | −6.1433E−01 | 4.1326E−01 | −1.1269E−01 |
| S5 | −3.7226E+01 | −1.1374E−01 | 4.0449E−01 | −9.4637E−01 | 1.3448E+00 | −1.2336E+00 | 6.7499E−01 | −1.6566E−01 |
| S6 | 4.3401E+01 | −1.4097E−01 | 4.9433E−01 | −1.1099E+00 | 1.5476E+00 | −1.4559E+00 | 8.5830E−01 | −2.3536E−01 |
| S7 | −1.6384E+01 | 4.4369E−02 | 8.3685E−02 | −1.1356E−01 | 3.3687E−02 | 8.1109E−02 | −8.0513E−02 | 2.5827E−02 |
| S8 | 6.6276E+01 | −8.9718E−02 | −7.8495E−03 | 1.5664E−01 | −2.1118E−01 | 1.5517E−01 | −4.4209E−02 | −4.5913E−03 |
| S9 | 2.0112E+01 | −7.0626E−02 | −3.2771E−02 | 1.1635E−01 | −1.2185E−01 | 8.4299E−02 | −3.0848E−02 | 4.0472E−03 |
| S10 | −6.9014E+01 | 3.2314E−02 | −1.0119E−01 | 6.2867E−02 | −2.4373E−02 | 4.8468E−03 | −3.9935E−04 | −5.8207E−05 |
| S11 | 2.0000E+02 | −3.6671E−03 | −1.8253E−02 | 1.7057E−03 | 2.3145E−03 | −1.0659E−03 | 1.9152E−04 | −1.2958E−05 |
| S12 | −4.5312E+00 | −1.7636E−01 | 7.5453E−02 | −2.8297E−02 | 7.7167E−03 | −1.2089E−03 | 9.6074E−05 | −3.0252E−06 |
| S13 | −4.3205E+00 | −8.5660E−02 | 3.1445E−02 | −8.7943E−03 | 1.6891E−03 | −2.1418E−04 | 1.6046E−05 | −5.2982E−07 |

TABLE 12

| Lens surfaces | K | A | B | C | D | E | F | G |
|---|---|---|---|---|---|---|---|---|
| S2 | −1.643E+00 | −2.176E−02 | 1.729E−02 | −8.294E−02 | 1.256E−01 | −1.260E−01 | 7.467E−02 | −1.797E−02 |
| S3 | −1.178E+01 | −1.038E−01 | 4.492E−02 | −8.208E−02 | 2.746E−01 | −3.726E−01 | 2.454E−01 | −6.382E−02 |
| S4 | −3.947E+00 | −9.308E−02 | 9.528E−02 | −1.486E−01 | 4.388E−01 | −6.125E−01 | 4.156E−01 | −1.127E−01 |
| S5 | 1.592E+01 | −1.119E−01 | 4.023E−01 | −9.456E−01 | 1.346E+00 | −1.232E+00 | 6.762E−01 | −1.671E−01 |
| S6 | 4.704E+01 | −1.523E−01 | 4.966E−01 | −1.109E+00 | 1.549E+00 | −1.454E+00 | 8.591E−01 | −2.350E−01 |
| S7 | −1.192E+01 | 4.935E−02 | 8.554E−02 | −1.162E−01 | 3.161E−02 | 8.595E−02 | −7.558E−02 | 2.583E−02 |
| S8 | 3.797E+01 | −7.119E−02 | −1.118E−02 | 1.467E−01 | −2.133E−01 | 1.528E−01 | −4.455E−02 | −7.025E−03 |
| S9 | 1.630E+01 | −6.783E−02 | −2.263E−02 | 1.125E−01 | −1.229E−01 | 8.414E−02 | −3.092E−02 | 3.423E−03 |
| S10 | −2.000E+02 | 2.315E−02 | −1.047E−01 | 6.518E−02 | −2.488E−02 | 4.814E−03 | −1.974E−04 | −2.295E−05 |
| S11 | −1.441E+00 | −4.296E−03 | −2.351E−02 | 2.023E−02 | 2.404E−03 | −1.064E−03 | 1.916E−04 | −1.234E−05 |
| S12 | −3.284E+00 | −1.737E−01 | 7.484E−02 | −2.835E−02 | 7.721E−03 | −1.207E−03 | 9.629E−05 | −3.035E−06 |
| S13 | −4.353E+00 | −8.704E−02 | 3.211E−02 | −8.783E−03 | 1.680E−03 | −2.149E−04 | 1.606E−05 | −5.168E−07 |

Figure 12:
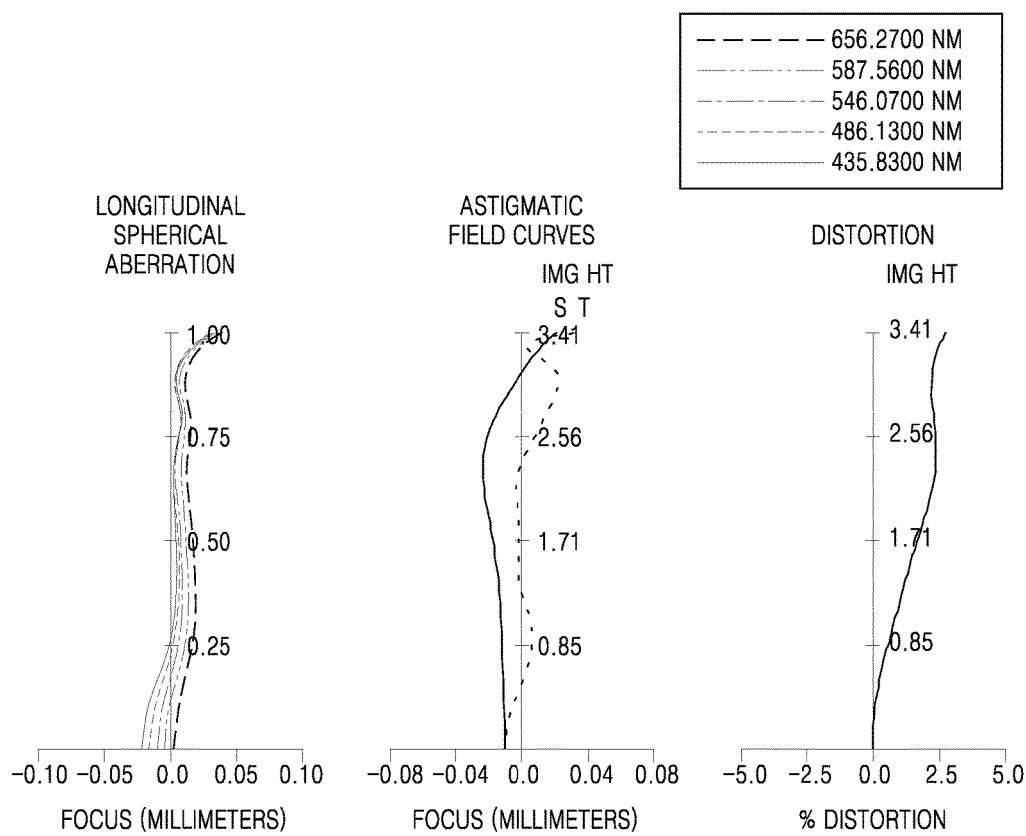
FIG. 12 illustrates aberration diagrams of the photographing lenses of the sixth embodiment.

FIG. 12 illustrates longitudinal spherical aberration, astigmatic field curves, and distortion of the photographing lenses L of the sixth embodiment.

<Seventh Embodiment>

Figure 13:
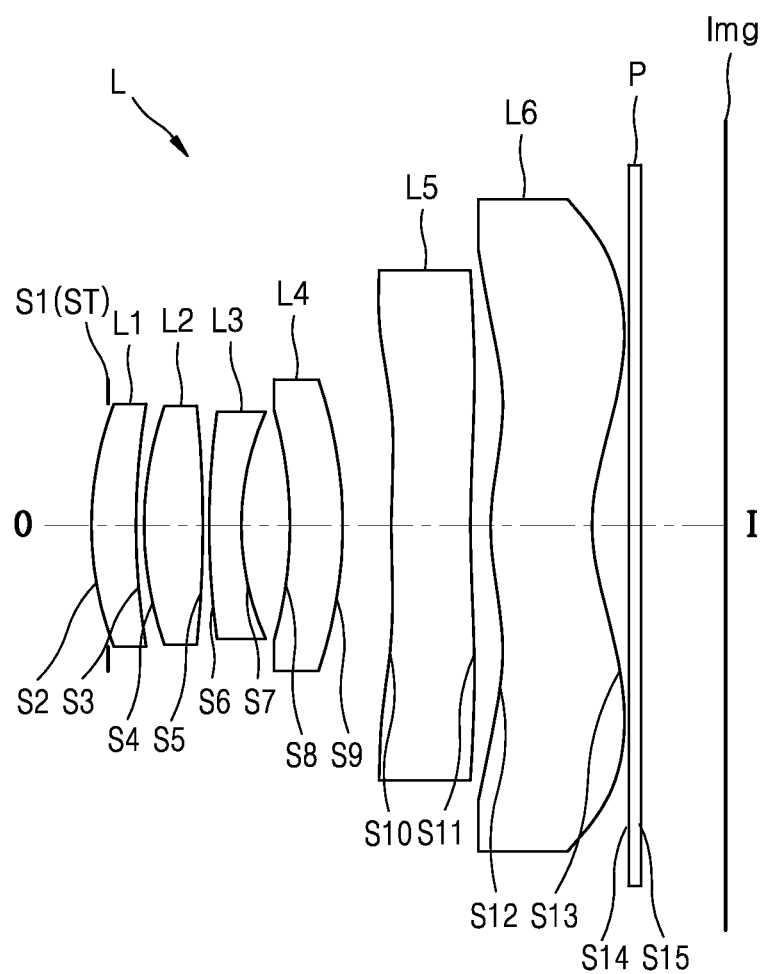
FIG. 13 illustrates photographing lenses according to a seventh embodiment.

FIG. 13 illustrates photographing lenses L according to a seventh embodiment, and design data for the photographing lenses L of the seventh embodiment is as follows.

In the seventh embodiment, the F-number of the photographing lenses L is 2.21, the half angle of view of the photographing lenses L is 36.6°, the focal length F of the photographing lenses L is 4.51 mm, the focal length f3 of the third lens L3 is −5.87 mm, the focal length f5 of the fifth lens L5 is −32.62 mm, and the focal length f6 of the sixth lens L6 is −20.75 mm.

TABLE 13

| Lens surfaces | Radius of curvature | Thickness or air gap | Refractive power | Abbe number |
|---|---|---|---|---|
| S1 (ST) | infinity | −0.150 | | |
| S2 | 2.085 | 0.392 | 1.544 | 56 |
| S3 | 2.705 | 0.060 | | |
| S4 | 2.245 | 0.509 | 1.544 | 56 |
| S5 | −14.835 | 0.050 | | |
| S6 | 7.035 | 0.278 | 1.651 | 22 |
| S7 | 2.455 | 0.396 | | |
| S8 | −7.705 | 0.455 | 1.651 | 22 |
| S9 | −6.012 | 0.415 | | |
| S10 | −100.000 | 0.677 | 1.651 | 22 |
| S11 | 27.405 | 0.162 | | |
| S12 | 2.261 | 0.864 | 1.535 | 56 |
| S13 | 1.629 | 0.311 | | |
| S14 | infinity | 0.110 | | |
| S15 | infinity | 0.710 | | |
| Img | infinity | 0.010 | | |

Table 14 below shows aspheric coefficients in the seventh embodiment.

Figure 14:
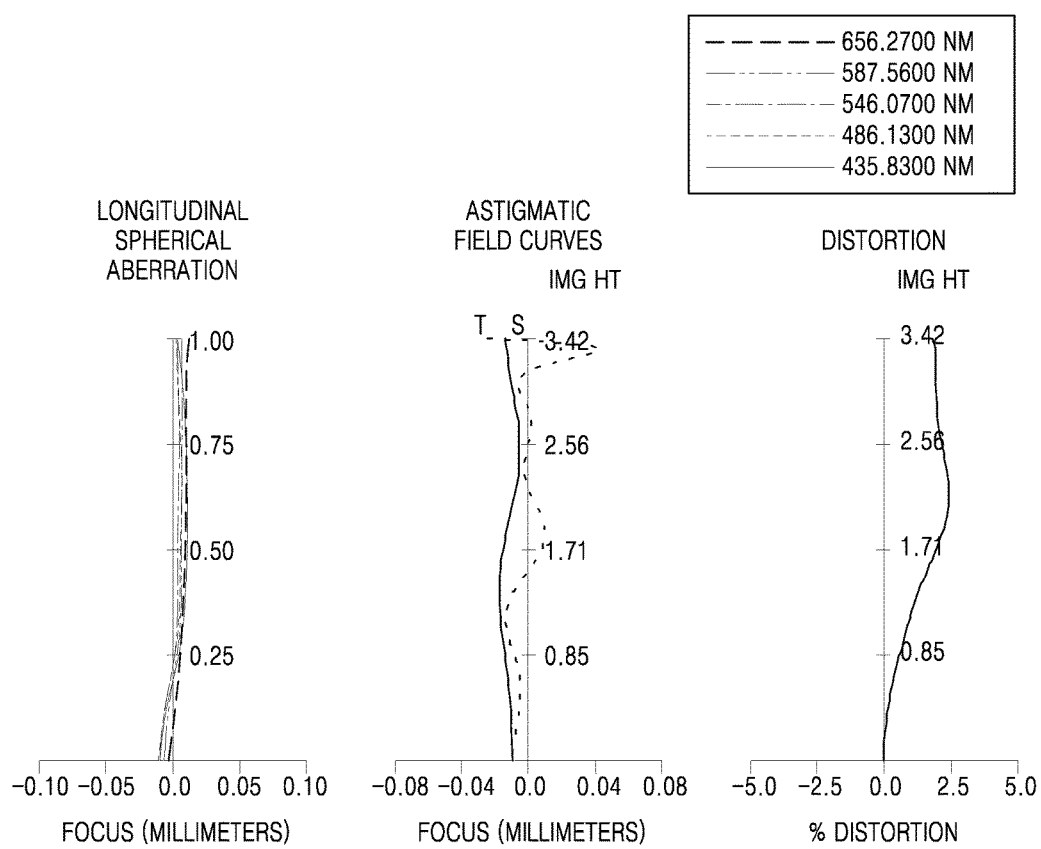
FIG. 14 illustrates aberration diagrams of the photographing lenses of the seventh embodiment.

FIG. 14 illustrates longitudinal spherical aberration, astigmatic field curves, and distortion of the photographing lenses L of the seventh embodiment.

<Eighth Embodiment>

Figure 15:
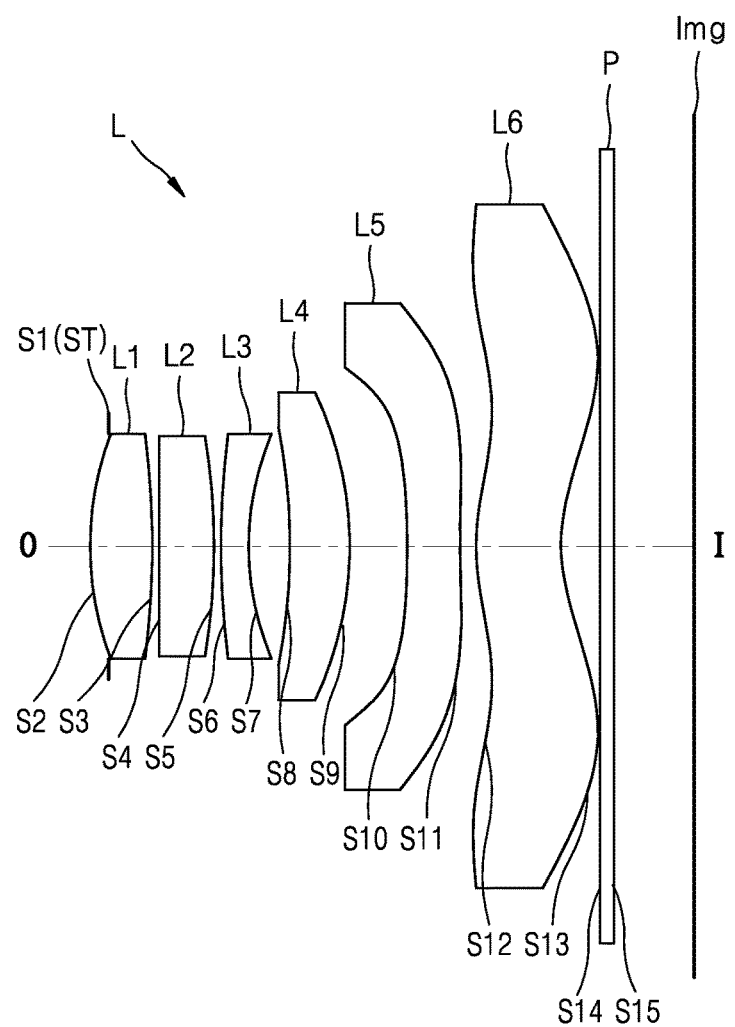
FIG. 15 illustrates photographing lenses according to an eighth embodiment.

FIG. 15 illustrates photographing lenses L according to an eighth embodiment, and design data for the photographing lenses L of the eighth embodiment is as follows.

In the eighth embodiment, the F-number of the photographing lenses L is 2.25, the half angle of view of the photographing lenses L is 37°, the focal length F of the photographing lenses L is 4.42 mm, the focal length f3 of the third lens L3 is −5.34 mm, the focal length f5 of the fifth lens L5 is −8.76 mm, and the focal length f6 of the sixth lens L6 is 51.70 mm.

TABLE 15

| Lens surfaces | Radius of curvature | Thickness or air gap | Refractive power | Abbe number |
|---|---|---|---|---|
| S1 (ST) | infinity | −0.150 | | |
| S2 | 2.227 | 0.538 | 1.544 | 56 |
| S3 | −200.454 | 0.065 | | |
| S4 | 46.421 | 0.491 | 1.544 | 56 |
| S5 | −6.219 | 0.050 | | |
| S6 | 7.623 | 0.250 | 1.642 | 22 |
| S7 | 2.349 | 0.375 | | |
| S8 | −14.924 | 0.515 | 1.64 | 23 |
| S9 | −5.309 | 0.505 | | |
| S10 | −7.089 | 0.485 | 1.642 | 22 |
| S11 | 29.279 | 0.130 | | |
| S12 | 1.681 | 0.766 | 1.535 | 56 |
| S13 | 1.504 | 0.341 | | |
| S14 | infinity | 0.110 | 1.514 | 55 |
| S15 | infinity | 0.709 | | |
| Img | infinity | 0.010 | | |

Table 16 below shows aspheric coefficients in the eighth embodiment.

TABLE 14

| Lens surfaces | K | A | B | C | D | E | F | G |
|---|---|---|---|---|---|---|---|---|
| S2 | −1.7187E+00 | −2.5699E−02 | 7.0468E−03 | −8.5996E−02 | 1.2633E−01 | −1.2493E−01 | 7.4825E−02 | −1.8730E−02 |
| S3 | −1.1648E+01 | −1.0886E−01 | 3.9227E−02 | −8.5735E−02 | 2.7375E−01 | −3.7222E−01 | 2.4477E−01 | −6.4500E−02 |
| S4 | −3.8825E+00 | −9.2180E−02 | 9.6817E−02 | −1.4810E−01 | 4.3659E−01 | −6.1439E−01 | 4.1448E−01 | −1.1269E−01 |
| S5 | −1.4894E+02 | −1.0948E−01 | 4.0595E−01 | −9.4522E−01 | 1.3455E+00 | −1.2336E+00 | 6.7446E−01 | −1.6611E−01 |
| S6 | 4.3548E+01 | −1.3662E−01 | 4.9987E−01 | −1.1063E+00 | 1.5489E+00 | −1.4561E+00 | 8.5704E−01 | −2.3736E−01 |
| S7 | −1.2439E+01 | 5.5188E−02 | 8.7747E−02 | −1.1355E−01 | 3.5413E−02 | 8.5010E−02 | −7.7934E−02 | 2.5823E−02 |
| S8 | 5.3478E+01 | −8.1076E−02 | −1.5550E−02 | 1.5048E−01 | −2.1225E−01 | 1.5821E−01 | −4.0444E−02 | −3.3439E−03 |
| S9 | 2.0917E+01 | −6.2711E−02 | −2.9590E−02 | 1.1587E−01 | −1.2111E−01 | 8.5182E−02 | −3.0353E−02 | 4.1959E−03 |
| S10 | −2.0000E+02 | 4.4547E−02 | −9.3885E−02 | 6.4332E−02 | −2.4109E−02 | 4.9405E−03 | −3.4400E−04 | −2.2951E−05 |
| S11 | 1.5439E+02 | 1.6720E−02 | −1.7631E−02 | 1.7736E−03 | 2.3307E−03 | −1.0637E−03 | 1.9141E−04 | −1.3146E−05 |
| S12 | −1.3635E+00 | −1.6921E−01 | 7.4838E−02 | −2.8422E−02 | 7.7036E−03 | −1.2095E−03 | 9.6207E−05 | −2.9662E−06 |
| S13 | −4.3050E+00 | −7.2439E−02 | 2.8193E−02 | −8.6252E−03 | 1.7007E−03 | −2.1438E−04 | 1.6010E−05 | −5.3695E−07 |

TABLE 16

| Lens surfaces | K | A | B | C | D | E | F | G |
|---|---|---|---|---|---|---|---|---|
| S2 | −1.2540E+00 | −2.1330E−02 | 5.2094E−03 | −8.5996E−02 | 1.2636E−01 | −1.2519E−01 | 7.4120E−02 | −1.8002E−02 |
| S3 | −2.0000E+02 | −1.0221E−01 | 4.4392E−02 | −8.1382E−02 | 2.7480E−01 | −3.7290E−01 | 2.4252E−01 | −6.4494E−02 |
| S4 | −6.4021E+02 | −7.9436E−02 | 9.9051E−02 | −1.4981E−01 | 4.3731E−01 | −6.1408E−01 | 4.1300E−01 | −1.1269E−01 |
| S5 | −1.0959E+02 | −1.0933E−01 | 4.0076E−01 | −9.5377E−01 | 1.3470E+00 | −1.2268E+00 | 6.7841E−01 | −1.7106E−01 |
| S6 | 4.7468E+01 | −1.5270E−01 | 4.9832E−01 | −1.1004E+00 | 1.5526E+00 | −1.4556E+00 | 8.5739E−01 | −2.3382E−01 |
| S7 | −1.4645E+01 | 1.2399E−02 | 9.1336E−02 | −9.2030E−02 | 2.4829E−02 | 5.9911E−02 | −6.1988E−02 | 2.5828E−02 |
| S8 | 8.0277E+01 | −6.2579E−02 | −3.1877E−02 | 1.4355E−01 | −2.1342E−01 | 1.5979E−01 | −4.1055E−02 | −1.0025E−02 |
| S9 | 1.3313E+01 | −3.6279E−02 | −4.8148E−02 | 1.1772E−01 | −1.2016E−01 | 8.3126E−02 | −3.1745E−02 | 4.6679E−03 |
| S10 | −1.7120E+02 | 1.0638E−02 | −1.0189E−01 | 6.1091E−02 | −2.1235E−02 | 4.8826E−03 | −6.0568E−04 | −5.1895E−05 |
| S11 | 1.7899E+02 | −1.7029E−02 | −1.6637E−02 | 2.1872E−03 | 2.3340E−03 | −1.0591E−03 | 1.9164E−04 | −1.4024E−05 |
| S12 | −5.0155E+00 | −1.3326E−01 | 6.7947E−02 | −2.8414E−02 | 7.7664E−03 | −1.2016E−03 | 9.6381E−05 | −3.1326E−06 |
| S13 | −4.2973E+00 | −7.0560E−02 | 2.7386E−02 | −8.3281E−03 | 1.6769E−03 | −2.1669E−04 | 1.5988E−05 | −4.9639E−07 |

Figure 16:
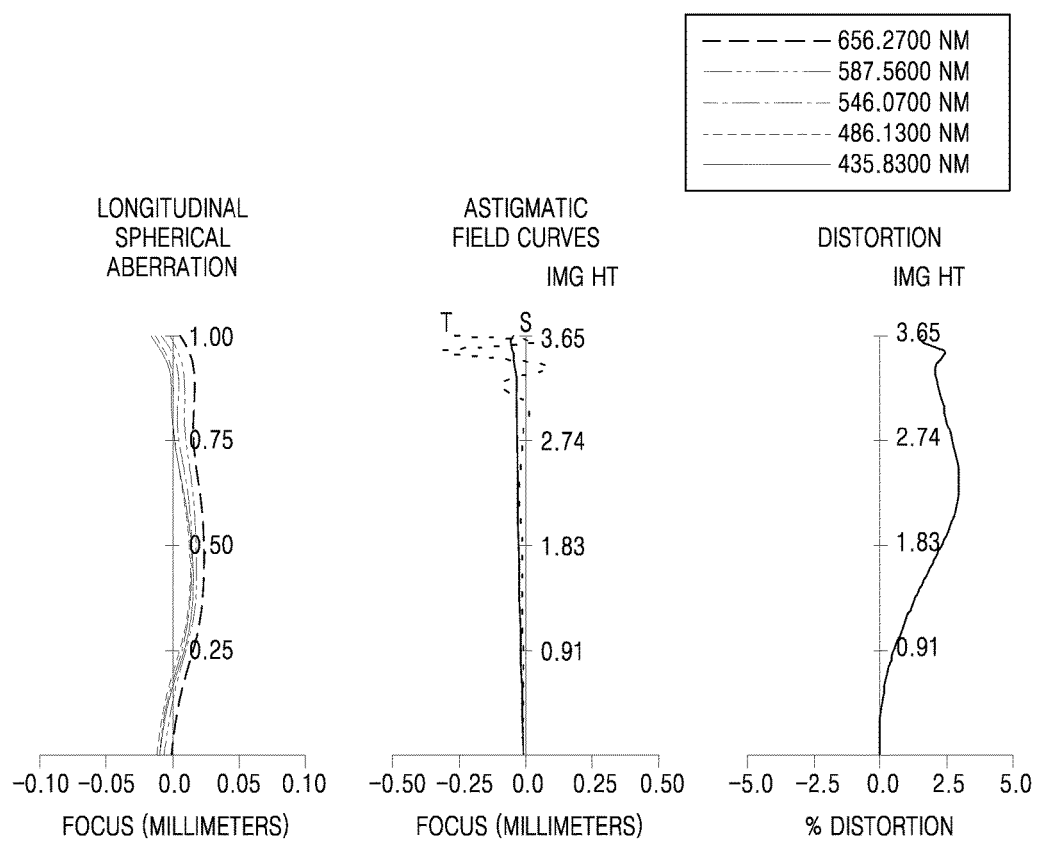
FIG. 16 illustrates aberration diagrams of the photographing lenses of the eighth embodiment.

FIG. 16 illustrates longitudinal spherical aberration, astigmatic field curves, and distortion of the photographing lenses L of the eighth embodiment.

<Ninth Embodiment>

Figure 17:
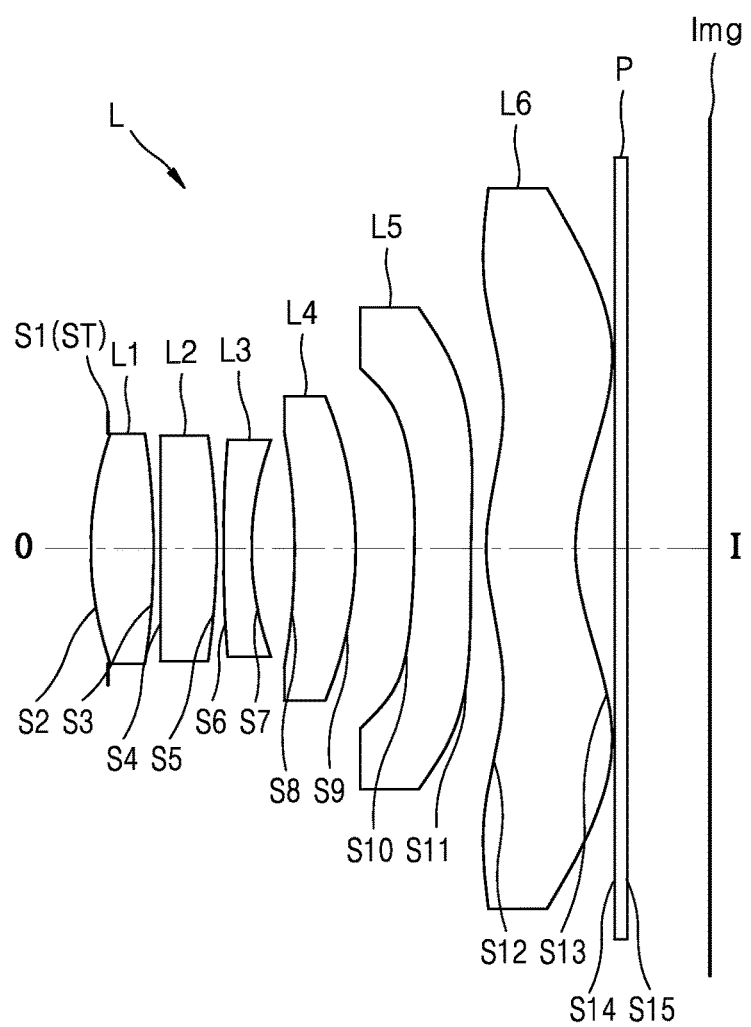
FIG. 17 illustrates photographing lenses according to a ninth embodiment.

FIG. 17 illustrates photographing lenses L according to a ninth embodiment, and design data for the photographing lenses L of the ninth embodiment is as follows.

In the ninth embodiment of the disclosure, the F-number of the photographing lenses L is 2.27, the half angle of view of the photographing lenses L is 37°, the focal length F of the photographing lenses L is 4.44 mm, the focal length f3 of the third lens L3 is −5.33 mm, the focal length f5 of the fifth lens L5 is −8.76 mm, and the focal length f6 of the sixth lens L6 is 59.84 mm.

TABLE 17

| Lens surfaces | Radius of curvature | Thickness or air gap | Refractive power | Abbe number |
|---|---|---|---|---|
| S1 (ST) | infinity | −0.150 | | |
| S2 | 2.242 | 0.546 | 1.544 | 56 |
| S3 | −42.150 | 0.061 | | |
| S4 | 370.069 | 0.491 | 1.544 | 56 |
| S5 | −6.104 | 0.050 | | |
| S6 | 7.614 | 0.250 | 1.642 | 22 |
| S7 | 2.346 | 0.378 | | |
| S8 | −14.977 | 0.518 | 1.64 | 23 |
| S9 | −5.309 | 0.505 | | |
| S10 | −7.106 | 0.485 | 1.642 | 22 |
| S11 | 29.035 | 0.138 | | |
| S12 | 1.681 | 0.765 | 1.535 | 56 |
| S13 | 1.491 | 0.345 | | |
| S14 | infinity | 0.110 | 1.514 | 55 |
| S15 | infinity | 0.708 | | |
| Img | infinity | 0.010 | | |

Table 18 below shows aspheric coefficients in the ninth embodiment of the disclosure.

Figure 18:
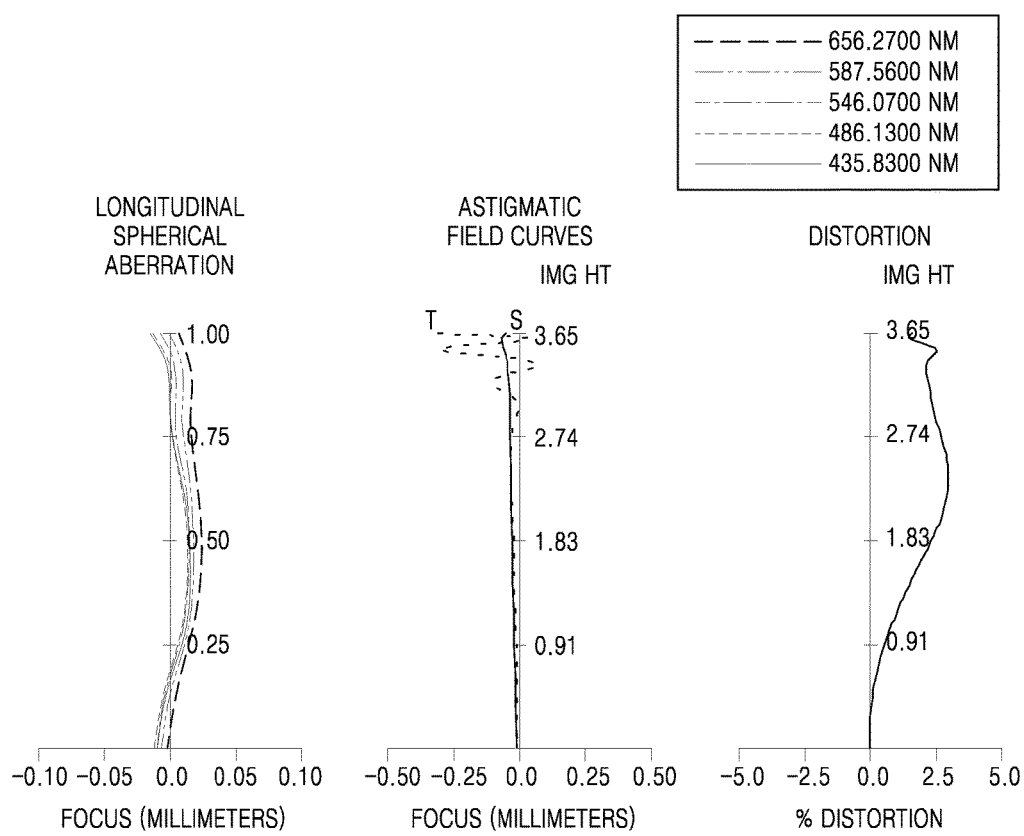
FIG. 18 illustrates aberration diagrams of the photographing lenses of the ninth embodiment.

FIG. 18 illustrates longitudinal spherical aberration, astigmatic field curves, and distortion of the photographing lenses L of the ninth embodiment of the disclosure.

<Tenth Embodiment>

Figure 19:
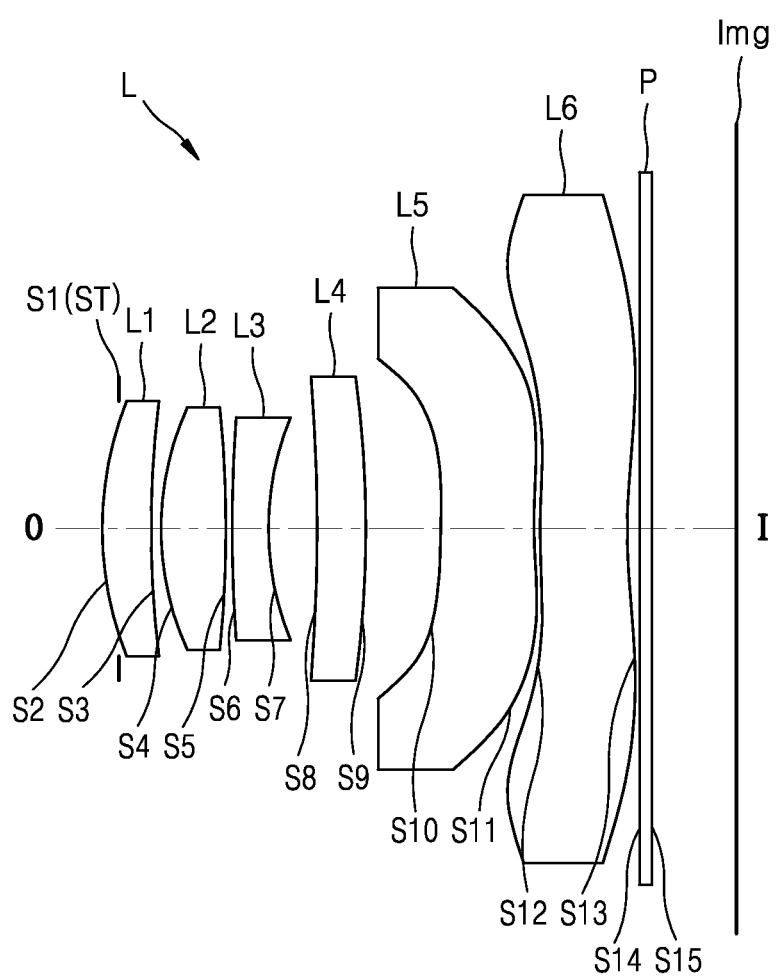
FIG. 19 illustrates photographing lenses according to a tenth embodiment.

FIG. 19 illustrates photographing lenses L according to a tenth embodiment of the disclosure, and design data for the photographing lenses L of the tenth embodiment is as follows.

In the tenth embodiment, the F-number of the photographing lenses L is 2.28, the half angle of view of the photographing lenses L is 34°, the focal length F of the photographing lenses L is 4.87 mm, the focal length f3 of the third lens L3 is −5.81 mm, the focal length f5 of the fifth lens L5 is −15 mm, and the focal length f6 of the sixth lens L6 is 20.23 mm.

TABLE 19

| Lens surfaces | Radius of curvature | Thickness or air gap | Refractive power | Abbe number |
|---|---|---|---|---|
| S1 (ST) | infinity | −0.150 | | |
| S2 | 2.011 | 0.411 | 1.544 | 56 |
| S3 | 2.964 | 0.099 | | |
| S4 | 2.313 | 0.541 | 1.544 | 56 |
| S5 | −23.327 | 0.050 | | |
| S6 | 7.468 | 0.315 | 1.642 | 22 |
| S7 | 2.401 | 0.419 | | |
| S8 | 18.974 | 0.410 | 1.64 | 23 |
| S9 | −29.659 | 0.631 | | |
| S10 | −13.466 | 0.803 | 1.642 | 22 |
| S11 | 7.189 | 0.050 | | |
| S12 | 6.100 | 0.736 | 1.535 | 56 |
| S13 | 5.000 | 0.095 | | |
| S14 | infinity | 0.110 | 1.514 | 55 |
| S15 | infinity | 0.719 | | |
| Img | infinity | 0.010 | | |

Table 20 below shows aspheric coefficients in the tenth embodiment of the disclosure.

TABLE 18

| Lens surfaces | K | A | B | C | D | E | F | G |
|---|---|---|---|---|---|---|---|---|
| S2 | −1.2491E+00 | −2.1311E−02 | 4.7812E−03 | −8.6422E−02 | 1.2608E−01 | −1.2532E−01 | 7.4083E−02 | −1.7990E−02 |
| S3 | −2.0000E+02 | −1.0168E−01 | 4.4581E−02 | −8.1540E−02 | 2.7448E−01 | −3.7322E−01 | 2.4229E−01 | −6.4494E−02 |
| S4 | 6.5183E+03 | −7.9436E−02 | 9.9263E−02 | −1.4959E−01 | 4.3740E−01 | −6.1420E−01 | 4.1263E−01 | −1.1269E−01 |
| S5 | −1.0708E+02 | −1.0965E−01 | 4.0058E−01 | −9.5381E−01 | 1.3471E+00 | −1.2267E+00 | 6.7849E−01 | −1.7099E−01 |
| S6 | 4.7494E+01 | −1.5266E−01 | 4.9826E−01 | −1.1005E+00 | 1.5525E+00 | −1.4556E+00 | 8.5748E−01 | −2.3363E−01 |
| S7 | −1.4794E+01 | 1.2293E−02 | 9.1335E−02 | −9.2082E−02 | 2.4731E−02 | 5.9817E−02 | −6.2034E−02 | 2.5828E−02 |
| S8 | 8.4163E+01 | −6.2972E−02 | −3.1865E−02 | 1.4360E−01 | −2.1345E−01 | 1.5969E−01 | −4.1201E−02 | −1.0175E−02 |
| S9 | 1.3347E+01 | −3.6079E−02 | −4.8235E−02 | 1.1765E−01 | −1.2020E−01 | 8.3108E−02 | −3.1756E−02 | 4.6605E−03 |
| S10 | −1.6448E+02 | 1.0886E−02 | −1.0186E−01 | 6.1116E−02 | −2.1220E−02 | 4.8875E−03 | −6.0551E−04 | −5.2316E−05 |
| S11 | 1.8055E+02 | −1.6661E−02 | −1.6577E−02 | 2.1944E−03 | 2.3351E−03 | −1.0589E−03 | 1.9168E−04 | −1.4014E−05 |
| S12 | −5.0051E+00 | −1.3323E−01 | 6.7948E−02 | −2.8414E−02 | 7.7664E−03 | −1.2016E−03 | 9.6381E−05 | −3.1326E−06 |
| S13 | −4.2925E+00 | −7.0552E−02 | 2.7387E−02 | −8.3279E−03 | 1.6769E−03 | −2.1670E−04 | 1.5988E−05 | −4.9640E−07 |

TABLE 20

| Lens surfaces | K | A | B | C | D | E | F | G |
|---|---|---|---|---|---|---|---|---|
| S2 | -1.8293E+00 | -2.5925E-02 | 6.9286E-03 | -8.1336E-02 | 1.2955E-01 | -1.2408E-01 | 7.2852E-02 | -1.8114E-02 |
| S3 | -1.0808E+01 | -1.0437E-01 | 4.2527E-02 | -8.2326E-02 | 2.7463E-01 | -3.7113E-01 | 2.4520E-01 | -6.4499E-02 |
| S4 | -1.5897E+00 | -8.3337E-02 | 9.5236E-02 | -1.4962E-01 | 4.3801E-01 | -6.1334E-01 | 4.1396E-01 | -1.1269E-01 |
| S5 | -2.0000E+02 | -1.0221E-01 | 4.0462E-01 | -9.5400E-01 | 1.3457E+00 | -1.2273E+00 | 6.7393E-01 | -1.6813E-01 |
| S7 | 4.8071E+01 | -1.5719E-01 | 4.9856E-01 | -1.0972E+00 | 1.5530E+00 | -1.4592E+00 | 8.5102E-01 | -2.3226E-01 |
| S8 | -1.0547E+01 | 2.1454E-02 | 9.4592E-02 | -9.0201E-02 | 3.0509E-02 | 6.7389E-02 | -5.7462E-02 | 2.5846E-02 |
| S9 | -1.2279E+02 | -5.6436E-02 | -3.4561E-02 | 1.4325E-01 | -2.1500E-01 | 1.5691E-01 | -4.2359E-02 | -7.7504E-03 |
| S10 | -1.3933E+02 | -4.0123E-02 | -4.2011E-02 | 1.1839E-01 | -1.2150E-01 | 8.2116E-02 | -3.2198E-02 | 4.5991E-03 |
| S11 | 7.8847E+01 | -5.3170E-02 | -7.5367E-02 | 5.2954E-02 | -2.2438E-02 | 5.3934E-03 | -3.7452E-04 | 3.5568E-06 |
| S12 | -1.3529E+02 | -4.7777E-02 | -1.0767E-02 | 1.3095E-03 | 2.1948E-03 | -1.0503E-03 | 1.9748E-04 | -1.2976E-05 |
| S13 | 3.8591E-01 | -1.3005E-01 | 6.7980E-02 | -2.8415E-02 | 7.7663E-03 | -1.2016E-03 | 9.6381E-05 | -3.1336E-06 |
| S14 | -2.3700E-01 | -6.6630E-02 | 2.7206E-02 | -8.3538E-03 | 1.6779E-03 | -2.1633E-04 | 1.6015E-05 | -4.9827E-07 |

Figure 20:
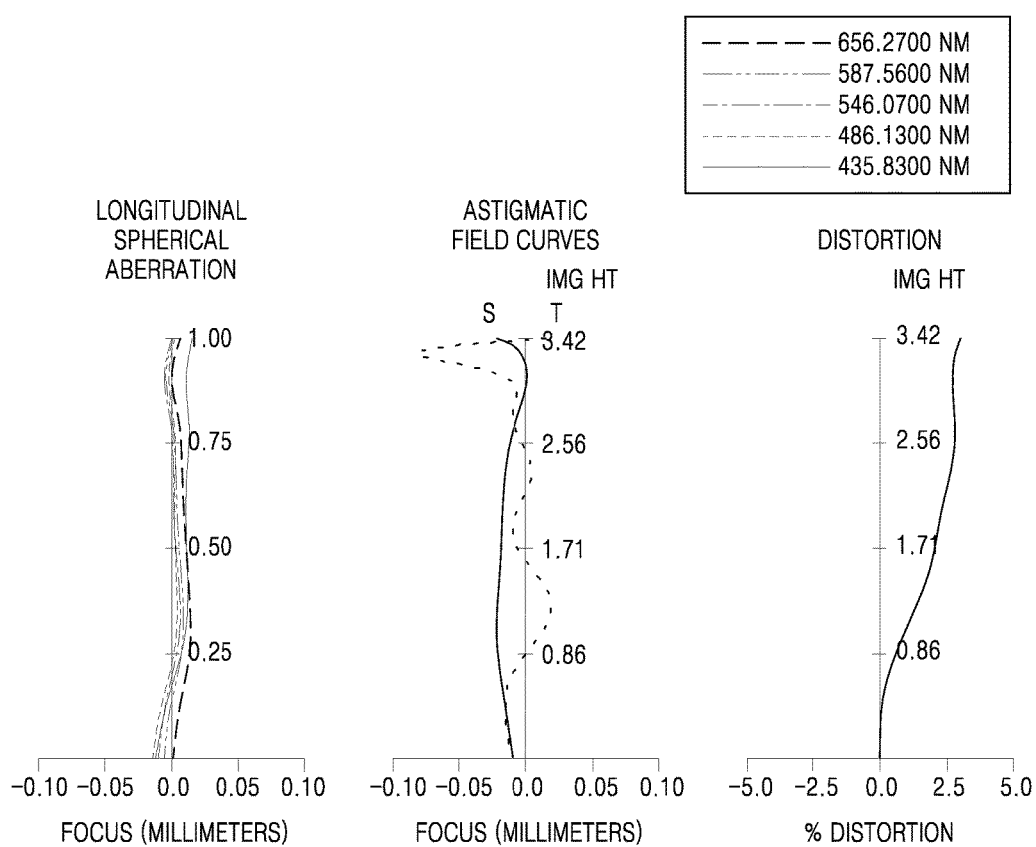
FIG. 20 illustrates aberration diagrams of the photographing lenses of the tenth embodiment.

FIG. 20 illustrates longitudinal spherical aberration, astigmatic field curves, and distortion of the photographing lenses L of the tenth embodiment.

<Eleventh Embodiment>

Figure 21:
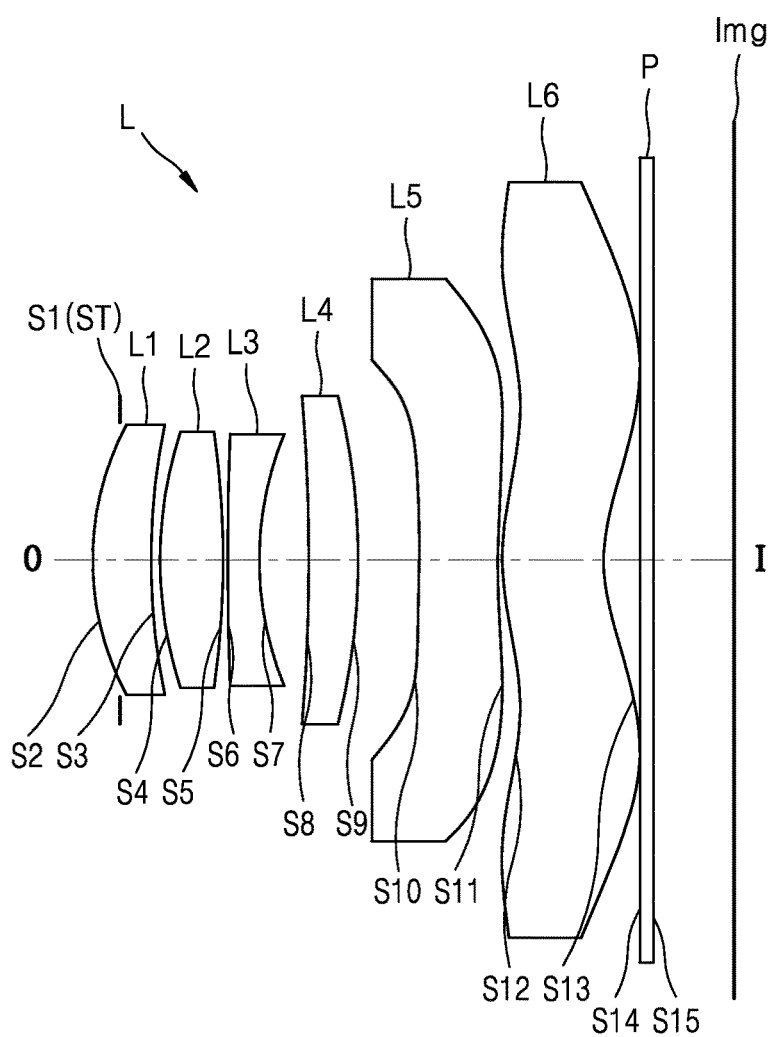
FIG. 21 illustrates photographing lenses according to an eleventh embodiment.

FIG. 21 illustrates photographing lenses L according to an eleventh embodiment of the disclosure, and design data for the photographing lenses L of the eleventh embodiment is as follows.

In the eleventh embodiment of the disclosure, the F-number of the photographing lenses L is 1.97, the half angle of view of the photographing lenses L is 37°, the focal length F of the photographing lenses L is 4.42 mm, the focal length f3 of the third lens L3 is -5.26 mm, the focal length f5 of the fifth lens L5 is -11.45 mm, and the focal length f6 of the sixth lens L6 is -155.12 mm.

TABLE 21

| Lens surfaces | Radius of curvature | Thickness or air gap | Refractive power | Abbe number |
|---|---|---|---|---|
| S1 (ST) | | -0.230 | | |
| S2 | 2.029 | 0.492 | 1.544 | 56 |
| S3 | 2.918 | 0.078 | | |
| S4 | 2.654 | 0.528 | 1.544 | 56 |
| S5 | -12.152 | 0.031 | | |
| S6 | 7.620 | 0.273 | 1.658 | 22 |
| S7 | 2.348 | 0.411 | | |
| S8 | -96.263 | 0.417 | 1.62 | 26 |
| S9 | -6.980 | 0.506 | | |
| S10 | -6.288 | 0.659 | 1.535 | 56 |
| S11 | 300.000 | 0.032 | | |
| S12 | 1.858 | 0.850 | 1.535 | 56 |
| S13 | 1.526 | 0.290 | | |
| S14 | infinity | 0.110 | 1.514 | 55 |
| S15 | infinity | 0.676 | | |
| Img | infinity | 0.010 | | |

Table 22 below shows aspheric coefficients in the eleventh embodiment.

TABLE 22

| Lens surfaces | K | A | B | C | D | E | F | G | H |
|---|---|---|---|---|---|---|---|---|---|
| S2 | -9.63E-01 | -1.55E-02 | 1.19E-02 | -5.31E-02 | 7.91E-02 | -7.14E-02 | 3.69E-02 | -8.01E-03 | 0.00E+00 |
| S3 | -1.22E+01 | -9.67E-02 | 3.63E-02 | -4.06E-02 | 1.98E-01 | -2.50E-01 | 1.42E-01 | -3.22E-02 | 0.00E+00 |
| S4 | -5.97E+00 | -9.51E-02 | 4.63E-02 | -2.91E-02 | 2.59E-01 | -3.83E-01 | 2.36E-01 | -5.75E-02 | 0.00E+00 |
| S5 | -1.47E+02 | -9.04E-02 | 3.01E-01 | -6.63E-01 | 8.86E-01 | -7.65E-01 | 3.84E-01 | -8.46E-02 | 0.00E+00 |
| S6 | 4.40E+01 | -1.40E-01 | 3.75E-01 | -7.88E-01 | 9.94E-01 | -8.41E-01 | 4.46E-01 | -1.08E-01 | 0.00E+00 |
| S7 | -6.92E+00 | -7.89E-03 | 7.53E-02 | -7.48E-02 | 4.03E-03 | 6.00E-02 | -4.36E-02 | 1.28E-02 | 0.00E+00 |
| S8 | -2.00E+02 | -2.26E-02 | -7.66E-02 | 1.98E-01 | -2.36E-01 | 1.51E-01 | -4.16E-02 | -2.37E-04 | 0.00E+00 |
| S9 | -2.00E+02 | -6.49E-02 | -5.29E-03 | 4.53E-02 | -5.23E-02 | 4.67E-02 | -2.16E-02 | 3.56E-03 | 0.00E+00 |
| S10 | -2.00E+02 | 7.96E-02 | -1.28E-01 | 6.03E-02 | -1.62E-02 | 2.26E-03 | -8.34E-05 | -4.11E-06 | 9.42E-08 |
| S11 | -2.00E+02 | 6.58E-02 | -4.89E-02 | 1.02E-02 | 3.67E-04 | -6.38E-04 | 1.25E-04 | -8.32E-06 | 1.85E-08 |
| S12 | -6.86E+00 | -1.01E-01 | 5.10E-02 | -2.03E-02 | 5.08E-03 | -7.11E-04 | 5.15E-05 | -1.52E-06 | -1.50E-10 |
| S13 | -5.24E+00 | -5.85E-02 | 1.97E-02 | -5.64E-03 | 1.08E-03 | -1.30E-04 | 8.98E-06 | -2.66E-07 | 3.59E-10 |

Figure 22:
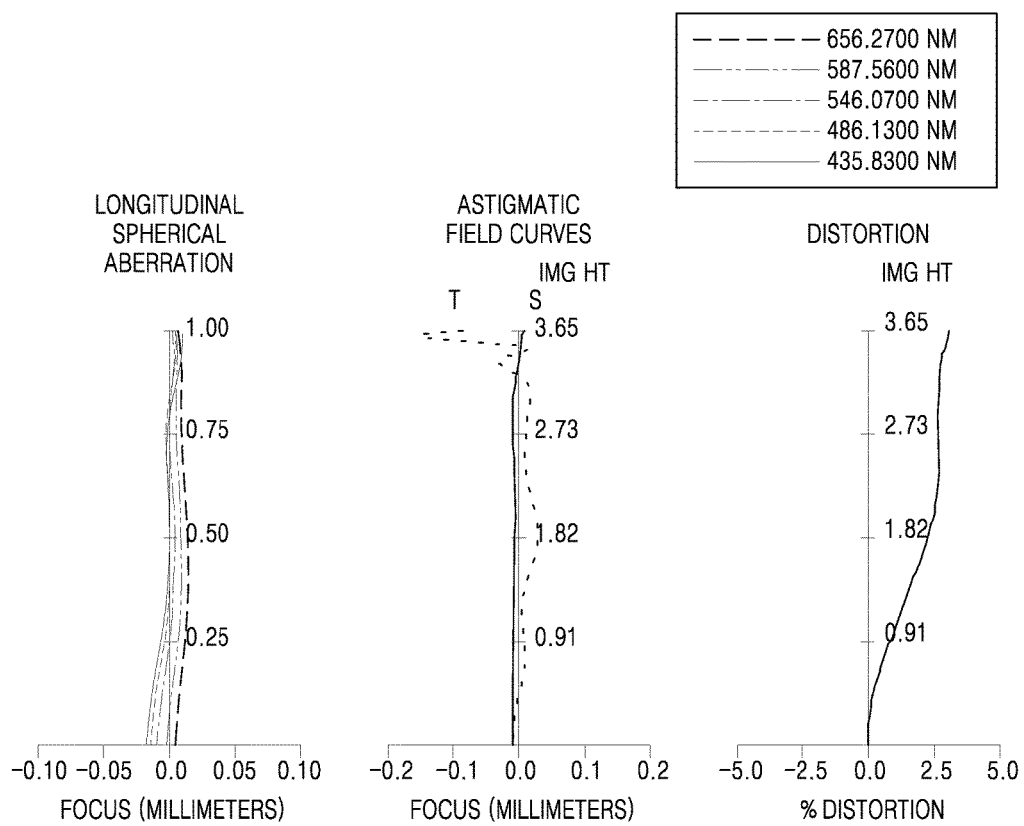
FIG. 22 illustrates aberration diagrams of the photographing lenses of the eleventh embodiment.

With reference to FIG. 22, in each of the above-described embodiments, the photographing lenses L include up to six lenses, and the refractive power of each lens is properly adjusted or located to reduce the aberration and total length of the photographing lenses L. Therefore, the photographing lenses L may have a compact shape. In addition, each of the photographing lenses L may be formed of a plastic material. In this case, the photographing lenses L may be easily manufactured with low costs.

Table 23 shows that the photographing lenses L of the first to eleventh embodiments satisfy Formulas 1 to 5.

TABLE 23

|  | f | f1 | f2 | f3 | f5 | f6 | |R2/R1| | f3/f5 | f12 | |f/f5| + |f/f6| | R12/R10 |
|---|---|---|---|---|---|---|---|---|---|---|---|
| *E1 | 4.58 | 11.12 | 3.71 | −5.59 | −16.42 | −9.95 | 1.36 | 0.34 | 2.96 | 0.74 | 0.03 |
| E2 | 4.46 | 10.99 | 3.77 | −5.55 | −10.29 | −87.14 | 1.42 | 0.54 | 2.98 | 0.48 | 0.03 |
| E3 | 4.53 | 49.74 | 2.99 | −5.38 | −10.60 | −45.16 | 1.02 | 0.51 | 2.99 | 0.53 | 0.02 |
| E4 | 4.43 | 10.13 | 3.96 | −5.75 | −65.16 | −12.87 | 1.52 | 0.09 | 3.02 | 0.41 | 0.02 |
| E5 | 4.44 | 4.46 | 8.62 | −6.03 | −52.29 | −16.68 | 42.02 | 0.12 | 3.09 | 0.35 | 0.03 |
| E6 | 4.35 | 12.56 | 3.59 | −5.50 | −66.79 | −21.37 | 1.32 | 0.08 | 2.99 | 0.27 | 0.03 |
| E7 | 4.51 | 13.60 | 3.61 | −5.87 | −32.62 | −20.75 | 1.30 | 0.18 | 3.03 | 0.36 | 0.06 |
| E8 | 4.42 | 4.03 | 10.07 | −5.34 | −8.76 | 51.70 | 90.00 | 0.61 | 3.03 | 0.59 | 0.05 |
| E9 | 4.44 | 3.91 | 10.99 | −5.33 | −8.76 | 59.84 | 18.80 | 0.61 | 3.03 | 0.58 | 0.05 |
| E10 | 4.87 | 9.93 | 3.88 | −5.81 | −15 | −20.23 | 1.47 | 0.39 | 2.97 | 0.57 | 0.69 |
| E11 | 4.42 | 10.19 | 4.03 | −5.26 | −11.45 | −155.12 | 1.44 | 0.46 | 3.11 | 0.41 | 0.005 |

*Embodiment

The photographing lenses L of the embodiments may be applied to various imaging or photographing devices such as complementary metal-oxide semiconductor (CMOS) or charge-coupled device (CCD) imaging devices, digital cameras including at least one lens, interchangeable lens cameras, video cameras, surveillance cameras, or mobile communication devices. In addition, the aberration of the photographing lenses L may be reduced to obtain high-resolution images by adjusting the radii of curvature of the surfaces of the photographing lenses L and applying aspheric surfaces to the photographing lenses L.

In addition, the six lenses of the photographing lenses L may be formed of plastic materials, and the distance between the six lenses of the photographing lenses L may be adjusted so as to reduce the weight and manufacturing costs of the photographing lenses L.

Figure 23:
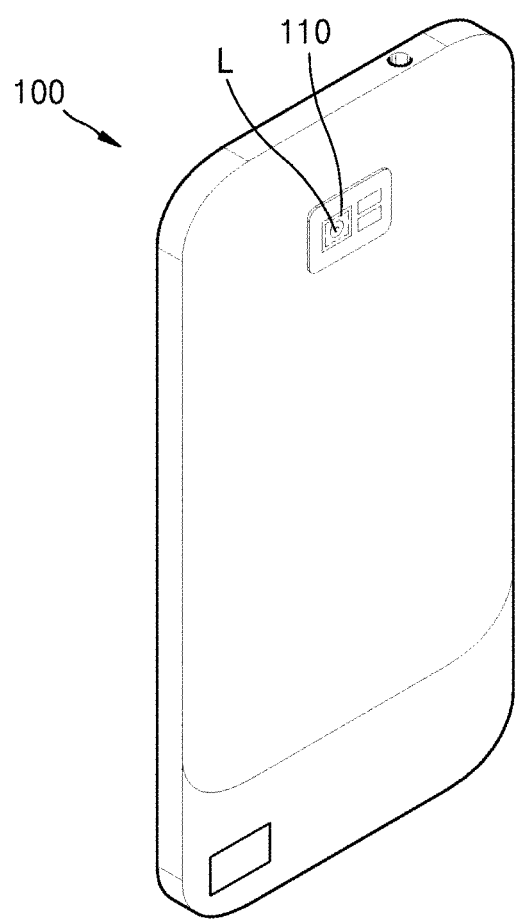
FIG. 23 is a schematic view illustrating a photographing apparatus according to an embodiment.

FIG. 23 is a view illustrating a photographing apparatus 100 including photographing lenses L according to an embodiment of the disclosure. FIG. 23 illustrates a non-limiting example in which the photographing apparatus 100 is applied to a mobile phone. The photographing apparatus 100 may include, for example: the photographing lenses L; and an image sensor 110 configured to converting light images formed by the photographing lenses L into electrical image signals. The photographing lenses L may be any of the photographing lenses L described with reference to FIGS. 1 to 22. If the photographing lenses L of the embodiments of the present disclosure are used in photographing apparatuses such as digital cameras and cameras of mobile devices, the photographing apparatuses may have small sizes and high photographing performance.

It should be understood that embodiments described herein should be considered for illustrative purposes only and these examples do not in any way limit the appended claims. Descriptions of features or aspects within each embodiment should typically be considered as available for other similar features or aspects in other embodiments.

The apparatuses and methods of the disclosure can be implemented in hardware, and in part as firmware or via the execution of software or computer code in conjunction with hardware that is stored on a non-transitory machine readable medium such as a CD ROM, a RAM, a floppy disk, a hard disk, or a magneto-optical disk, or computer code downloaded over a network originally stored on a remote recording medium or a non-transitory machine readable medium and stored on a local non-transitory recording medium for execution by hardware such as a processor, so that the methods described herein are loaded into hardware such as a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc., that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor", "microprocessor" "controller", or "control unit" constitute hardware in the claimed disclosure that contain circuitry that is configured for operation. Under the broadest reasonable interpretation, the appended claims constitute statutory subject matter in compliance with 35 U.S.C. §101 and none of the elements are software per se. No claim element herein is to be construed under the provisions of 35 U.S.C. 112, sixth paragraph, unless the element is expressly recited using the phrase "means for".

The definition of the terms "unit" or "module" as referred to herein are to be understood as constituting hardware circuitry such as a CCD, CMOS, SoC, AISC, FPGA, a processor or microprocessor (a controller) configured for a certain desired functionality, or a communication module containing hardware such as transmitter, receiver or transceiver, or a non-transitory medium comprising machine executable code that is loaded into and executed by hardware for operation, in accordance with statutory subject matter under 35 U.S.C. §101 and do not constitute software per se. For example, the image processor in the present disclosure, and any references to an input unit and/or an output unit both comprise hardware circuitry configured for operation.

While one or more embodiments have been described with reference to the figures, it will be understood by those of ordinary skill in the art that various changes in form and details may be made therein without departing from the spirit and scope as defined by the following claims.

What is claimed is:

1. A plurality of photographing lenses arranged positioned from an object side and an image side, the arrangement of the photographing lenses comprising:
a first lens closest to the object side having a positive refractive power and a convex object-side surface;
a second lens having a positive refractive power;
a third lens having a negative refractive power;
a fourth lens having a convex image-side surface;
a fifth lens having an object-side surface and an image-side surface that are shaped concave in a region around an optical axis of the photographing lenses, wherein at least one of the object-side surface and the image-side surface of the fifth lens has an inflection point; and
a sixth lens furthest from the object side having an image-side surface that is concave in a region around the optical axis of the photographing lenses,
wherein the first lens to sixth lens are sequentially arranged in a direction from the object side to the image side.

2. The plurality of photographing lenses of claim 1, wherein the arrangement of photographing lenses satisfies the following formula:

$|R2/R1|>1$ <Formula> wherein R1 denotes a radius of curvature of the object-side surface of the first lens, and R2 denotes a radius of curvature of an image-side surface of the first lens.

3. The plurality of photographing lenses of claim 1, wherein the arrangement of photographing lenses satisfies the following formula:

$0<f3/f5<1$ <Formula> wherein f3 denotes a focal length of the third lens, and f5 denotes a focal length of the fifth lens.

4. The plurality of photographing lenses of claim 1, wherein the arrangement of photographing lenses satisfies the following formula:

$0<R12/R10<1$ <Formula> wherein R10 denotes a radius of curvature of the image-side surface of the fifth lens, and R12 denotes a radius of curvature of the image-side surface of the sixth lens.

5. The plurality of photographing lenses of claim 1, wherein the sequential arrangement of photographing lenses satisfies the following formula:

$(f1+f2)/2>f12$ <Formula> wherein f1 denotes a focal length of the first lens, f2 denotes a focal length of the second lens, and f12 denotes a composite focal length of the first and second lenses.

6. The plurality of photographing lenses of claim 1, wherein the sequential arrangement of photographing lenses satisfies the following formulas:

$|R2/R1|>1$ $|f/f5|+|f/f6|1<1$ <Formulas> wherein R1 denotes a radius of curvature of the object-side surface of the first lens, R2 denotes a radius of curvature of an image-side surface of the first lens, f denotes a focal length of the photographing lenses, f5 denotes a focal length of the fifth lens, and f6 denotes a focal length of the sixth lens.

7. The plurality of photographing lenses of claim 1, wherein the third lens has a concave image-side surface.

8. The plurality of photographing lenses of claim 1, wherein the first lens comprises a double convex lens or a meniscus lens.

9. The plurality of photographing lenses of claim 1, wherein the fourth lens has a meniscus shape.

10. The plurality of photographing lenses of claim 1, wherein the sixth lens has an inflection point at least at one of the object-side surface and the image-side surface.

11. The plurality of photographing lenses of claim 1, wherein each of the first lens to sixth lens comprises a plastic lens.

12. The plurality of photographing lenses of claim 1, wherein each of the first lens to sixth lens has at least one aspheric surface.

13. The plurality of photographing lenses of claim 12, wherein each of the first lens to sixth lens is a double aspheric lens.

14. The plurality of photographing lenses of claim 1, wherein the fourth lens has a positive refractive power, the fifth lens has a negative refractive power, and the sixth lens has a negative or positive refractive power.

15. The plurality of photographing lenses of claim 1, further comprising an aperture stop arranged at a position between the object-side surface of the first lens and the third lens.

16. A photographing apparatus comprising:
a plurality of photographing lenses arranged in a sequential direction from an object side to an image side; and
an image sensor configured to receive light passing through the photographing lenses and convert the light into an electrical signal,
wherein the plurality of photographing lenses comprise:
a first lens arranged closest to the object side having a positive refractive power and a convex object-side surface;
a second lens having a positive refractive power;
a third lens having a negative refractive power;
a fourth lens having a convex image-side surface;
a fifth lens having an object-side surface and an image-side surface that are concave in a region around an optical axis of the photographing lenses, wherein at least one of the object-side surface and the image-side surface of the fifth lens has an inflection point; and
a sixth lens arranged furthest from the object having an image-side surface that is concave in a region around the optical axis of the photographing lenses,
wherein the first lens to sixth lens are sequentially arranged in a direction from the object side to the image side.

* * * * *